United States Patent
Iida

(10) Patent No.: US 8,186,147 B2
(45) Date of Patent: May 29, 2012

(54) CATALYST DETERIORATION-DETERMINATION DEVICE AND METHOD AND ENGINE CONTROL UNIT

(75) Inventor: Jun Iida, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 471 days.

(21) Appl. No.: 12/482,694

(22) Filed: Jun. 11, 2009

(65) Prior Publication Data

US 2009/0313974 A1    Dec. 24, 2009

(30) Foreign Application Priority Data

Jun. 20, 2008   (JP) ................................. 2008-161491

(51) Int. Cl.
*F01N 3/00* (2006.01)

(52) U.S. Cl. ................. 60/277; 60/285; 60/286; 60/274; 60/295; 60/301

(58) Field of Classification Search ............ 60/274, 60/277, 284–289, 295–301
See application file for complete search history.

(56) References Cited

U.S. PATENT DOCUMENTS

| 5,392,599 | A | * | 2/1995 | Hamburg et al. | ................ 60/274 |
| 5,414,996 | A |   | 5/1995 | Sawada et al. | |
| 5,758,494 | A | * | 6/1998 | Davey | ........................... 60/274 |
| 5,851,376 | A | * | 12/1998 | Nishioka et al. | ........... 205/784.5 |
| 6,131,439 | A | * | 10/2000 | Hamburg et al. | ............ 73/23.32 |
| 6,470,674 | B1 | * | 10/2002 | Yamaguchi et al. | ............ 60/277 |
| 6,925,372 | B2 | * | 8/2005 | Yasui | ............................ 701/109 |
| 2004/0163381 | A1 | | 8/2004 | Shirakawa et al. | |
| 2007/0240403 | A1 | * | 10/2007 | Miyasako et al. | .............. 60/277 |
| 2007/0298504 | A1 | | 12/2007 | Mueller et al. | |

FOREIGN PATENT DOCUMENTS

| EP | 1 054 141 A | 11/2000 |
| JP | 05-133264 A | 5/1993 |
| JP | 05-133264 A | 5/1993 |
| JP | 2001-193521 A | 7/2001 |

* cited by examiner

*Primary Examiner* — Thomas Denion
*Assistant Examiner* — Jesse Bogue
(74) *Attorney, Agent, or Firm* — Arent Fox LLP

(57) ABSTRACT

A catalyst deterioration-determining device capable of properly performing deterioration determination, while compensating for differences in output characteristics of oxygen concentration parameter sensors disposed upstream and downstream of the catalyst, respectively. After exhaust gases flowing into the catalyst having an oxygen storage capability are switched from oxidation atmosphere to reduction atmosphere, first and second equivalent ratios indicative of oxygen concentrations, detected by first and second LAF sensors disposed upstream and downstream of the catalyst, are integrated to calculate respective first and second reducing agent amount integrated values. The integrated values are corrected by dividing them by respective average values of the first and second equivalent ratios calculated after the lapse of a predetermined time period, such that differences in gains of the first and second LAF sensors are compensated for. Then, the corrected first and second integrated values are compared for catalyst deterioration determination.

12 Claims, 13 Drawing Sheets

CATALYST DETERIORATION-DETERMINATION DEVICE AND METHOD AND ENGINE CONTROL UNIT

BACKGROUND OF THE INVENTION

1. Field of the Invention

The present invention relates to a catalyst deterioration-determining device and method for determining deterioration of a catalyst that purifies exhaust gases from an internal combustion engine, and an engine control unit.

2. Description of the Related Art

Conventionally, there has been proposed a deterioration determination device of this kind in Japanese Laid-Open Patent Publication (Kokai) No. H05-133264. In this deterioration determination device, an upstream air-fuel ratio sensor and a downstream air-fuel ratio sensor are disposed in an exhaust passage on respective upstream and downstream sides of a three-way catalyst, for detecting the air-fuel ratio of a mixture burned in the engine, and the deterioration of the catalyst is determined in the following manner: First, the air-fuel ratio of the mixture is controlled to a leaner value than the stoichiometric air-fuel ratio, whereby oxygen in exhaust gases is caused to be fully adsorbed in the three-way catalyst. Then, the air-fuel ratio of the mixture is switched to a richer value than the stoichiometric air-fuel ratio, whereby unburned fuel in the exhaust gases is supplied to the three-way catalyst as reducing agents, to cause the same to react with oxygen adsorbed in the three-way catalyst. Thereafter, when the downstream air-fuel ratio detected by the downstream air-fuel ratio sensor becomes substantially equal to the upstream air-fuel ratio detected by the upstream air-fuel ratio sensor, the difference between the stoichiometric air-fuel ratio and the upstream air-fuel ratio at the time is multiplied by a time period (first time period) which has elapsed from the time of switching the air-fuel ratio of the mixture to the richer value, and a detected intake air amount, whereby a first oxygen amount indicative of the amount of oxygen adsorbed in the three-way catalyst is calculated.

Next, the air-fuel ratio of the mixture is switched to the leaner value again, whereby oxygen in exhaust gases is caused to be adsorbed in the three-way catalyst. Thereafter, when the downstream air-fuel ratio becomes substantially equal to the upstream air-fuel ratio, the difference between the upstream air-fuel ratio at the time and the stoichiometric air-fuel ratio is multiplied by a time period (second time period) which has elapsed from the time of switching the air-fuel ratio of the mixture to the leaner value, and a detected intake air amount, whereby a second oxygen amount indicative of the amount of oxygen adsorbed in the three-way catalyst is calculated. Then, as the average value of the first and second oxygen amounts is smaller, it is determined that the deterioration of the three-way catalyst is in a more advanced state.

As described above, the conventional deterioration determination device determines deterioration of the three-way catalyst, based on the first and second oxygen amounts calculated according to the first and second time periods which are taken before the downstream air-fuel ratio and the upstream air-fuel ratio become equal to each other after the air-fuel ratio of the mixture is switched between the leaner value and the richer value. However, if the output characteristics of the upstream and downstream air-fuel ratio sensors, particularly, the gains thereof, are different from each other, timing in which the downstream air-fuel ratio becomes actually equal to the upstream air-fuel ratio cannot be accurately grasped, which makes it impossible to accurately measure the aforementioned first and second time periods, and hence makes it possible to carry out accurate deterioration determination. Further, since the two air-fuel ratio sensors are disposed with the three-way catalyst therebetween, and exhaust gases having reacted flow into the downstream air-fuel ratio sensor and hence the composition and the activity of exhaust gases are different between the two air-fuel ratio sensors. This sometimes makes the output values from the two sensors exposed to exhaust gases having the same air-fuel ratio different from each other even though the output characteristics per se of the sensors are not different from each other. In this case as well, it is impossible to accurately grasp timing in which the downstream air-fuel ratio becomes equal to the upstream air-fuel ratio, which degrades the accuracy of the deterioration determination.

SUMMARY OF THE INVENTION

It is an object of the present invention to provide a catalyst deterioration-determining device and method, and an engine control unit, which are capable of properly determining deterioration of a catalyst while compensating for differences in output characteristics of oxygen concentration parameter sensors disposed upstream and downstream of the catalyst, respectively, which are caused by different output characteristics of the sensors themselves, or differences in the composition and activity of exhaust gases.

To attain the above object, in a first aspect of the present invention, there is provided a catalyst deterioration-determining device that determines deterioration of a catalyst disposed in an exhaust passage of an internal combustion engine, for purifying exhaust gases, the catalyst having an oxygen storage capability for storing oxygen, comprising a first oxygen concentration parameter sensor that detects an upstream oxygen concentration parameter indicative of an oxygen concentration in exhaust gases on an upstream side of the catalyst, a second oxygen concentration parameter sensor that detects a downstream oxygen concentration parameter indicative of an oxygen concentration in exhaust gases on a downstream side of the catalyst, control means for controlling exhaust gases flowing into the catalyst by switching the exhaust gases between an oxidation atmosphere and a reduction atmosphere, correction means for correcting the upstream oxygen concentration parameter and the downstream oxygen concentration parameter which are detected after the exhaust gases are switched by the control means, such that the upstream oxygen concentration parameter and the downstream oxygen concentration parameter which are detected after lapse of a predetermined time period coincide with each other, and deterioration determination means for determining deterioration of the catalyst based on results of comparison between the upstream oxygen concentration parameter and the downstream oxygen concentration parameter which are corrected.

With the configuration of the catalyst deterioration-determining device according to the first aspect of the present invention, a catalyst is provided in an exhaust passage of an internal combustion engine, for purifying exhaust gases. This catalyst has an oxygen storage capability, and when the exhaust gases form an oxidation atmosphere, it stores oxygen in the exhaust gases, whereas when the exhaust gases form a reduction atmosphere, it releases stored oxygen therein. According to the catalyst deterioration determining device, the first oxygen concentration parameter sensor detects an upstream oxygen concentration parameter indicative of an oxygen concentration in exhaust gases on the upstream side of the catalyst, and the second oxygen concentration parameter sensor detects a downstream oxygen concentration parameter indicative of an oxygen concentration in exhaust gases on the downstream side of the catalyst. When the deterioration determination is performed, the exhaust gases flowing into the catalyst is switched from one of the oxidation atmosphere and the reduction atmosphere to the other, and a comparison is made between the upstream oxygen concentration parameter and the downstream oxygen concentration parameter which are detected after the switching deterioration of the catalyst, determine the deterioration based on results of the comparison.

When the exhaust gases flowing into the catalyst are switched between the oxidation atmosphere and the reduction atmosphere, oxygen in exhaust gases is stored in the catalyst in the case of switching to the oxidation atmosphere, and the amount of oxygen stored at the time varies with the degree of deterioration of the catalyst. On the other hand, in the case of switching to the reduction atmosphere, due to reaction with reducing agents in the exhaust gases, oxygen stored in the catalyst is released. The amount of oxygen released at the time varies with the degree of deterioration of the catalyst. Therefore, a status of change in the oxygen concentration downstream of the catalyst after switching of the exhaust gases reflects a degree of deterioration of the catalyst, and as the degree of deterioration is higher, the delay of the downstream oxygen concentration with respect to the upstream oxygen concentration is smaller. Therefore, based on results of comparison between the upstream oxygen concentration parameter and the downstream oxygen concentration parameter detected after switching of the exhaust gases, it is possible to properly determine deterioration of the catalyst.

Further, in the case of switching to the oxidation atmosphere, when the storage of oxygen is completed, while in the case of switching to the reduction atmosphere, when the release of oxygen from the catalyst is completed, the oxygen concentration in exhaust gases downstream of the catalyst coincides with that in exhaust gases upstream of the same. Therefore, after a predetermined time period elapses after the switching of exhaust gases, the detected upstream and downstream oxygen concentration parameters should intrinsically coincide with each other. If not, it means that the output characteristics (gains) of the first and second oxygen concentration parameter sensors are different from each other due to the difference in the output characteristics of the sensors themselves or the difference in the composition or activity of exhaust gases, and the values of the two oxygen concentration parameters in such a case correspond to the magnitudes of the gains of the respective sensors.

According to the present invention, the upstream oxygen concentration parameter and the downstream oxygen concentration parameter detected after switching of exhaust gases are corrected such that the upstream and downstream oxygen concentration parameter detected after the elapse of the predetermined time period after the switching of exhaust gases come to coincide with each other. By this correction, it is possible to appropriately compensate for a difference in the output characteristic between the first and second oxygen concentration parameter sensors, if there occurs the difference. Then, based on results of comparison between the thus corrected upstream and downstream oxygen concentration parameters, the deterioration of the catalyst is determined. This makes it possible to carry out an appropriate deterioration determining without being adversely affected by the difference in the output characteristics of the first and second oxygen concentration parameter sensors, and thereby improve the accuracy of the determination.

Preferably, the catalyst deterioration-determining device further comprises integrated value-calculating means for calculating an integrated value of the upstream oxygen concentration parameter and an integrated value of the downstream oxygen concentration parameter, and the correction means corrects the integrated value of the upstream oxygen concentration parameter and the integrated value of the downstream oxygen concentration parameter, by calculating a ratio between the calculated integrated value of the upstream oxygen concentration parameter and the upstream oxygen concentration parameter detected after the lapse of the predetermined time period, and a ratio between the calculated integrated value of the downstream oxygen concentration parameter and the downstream oxygen concentration parameter detected after the lapse of the predetermined time period, the deterioration determining means determining the deterioration of the catalyst based on results of comparison between the corrected integrated value of the upstream oxygen concentration parameter and the corrected integrated value of the downstream oxygen concentration parameter.

With the configuration of this preferred embodiment, respective integrated values of the upstream and downstream oxygen concentration parameters detected after the lapse of the predetermined time period after the switching of the exhaust gases are calculated, and the integrated values are corrected by calculating respective ratios between the integrated values and the corresponding oxygen concentration parameters detected after the lapse of the predetermined time period. Then, based on results of comparison between the corrected integrated values, the deterioration of the catalyst is determined.

As described above, as the upstream and downstream oxygen concentration parameters for use in the deterioration determination, the respective integrated values thereof are used. This makes it possible to appropriately accommodate influence of temporary fluctuation in the output values of the first and second oxygen concentration parameter sensors and errors thereof. Further, since the integrated values are corrected by calculating ratios between the respective integrated values and associated oxygen concentration parameters detected after the lapse of the predetermined time period, it is possible to appropriately compensate for the difference in the gains of the first and second oxygen concentration parameter sensors such that the upstream and downstream oxygen concentration parameters detected after the lapse of the predetermined time period coincide with each other.

For example, if an oxygen concentration parameter sensor has a gain larger than the proper value, it gives somewhat larger values of the oxygen concentration parameter than the correct values over an entire range of time from within the predetermined time period to after the lapse of the predetermined time period, and hence by dividing the integrated value calculated based on the oxygen concentration parameter detected within the predetermined time period by the oxygen concentration parameter detected after the lapser of the predetermined time period, it is possible to appropriately correct the integrated value to a smaller value with ease. Inversely, if the oxygen concentration parameter sensor has a gain smaller than the proper value, it is possible to appropriately correct the integrated value to a larger value. Therefore, by comparing the integrated values subjected to gain correction with each other, it is possible to more appropriately determine the deterioration of the determination, to thereby further improve the accuracy of the determination.

More preferably, the correction means multiplies the corrected integrated values of the upstream oxygen concentration parameter and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameter.

With the configuration of this preferred embodiment, by multiplying the integrated values of the upstream and downstream oxygen concentration parameters corrected as mentioned above, by one of the oxygen concentration parameters detected after the lapser of the predetermined time period, the integrated values are subjected to gain correction with reference to the output value from one of the oxygen concentration parameter sensors which detects the one oxygen concentration parameter. For example, when the output value from the first oxygen concentration parameter disposed on the upstream side is used as a reference, it is possible to determine the integrated values of the upstream and downstream oxygen concentration parameters which more accurately reflect oxygen concentrations, based on the results of detection by the first oxygen concentration parameter sensor for exhaust gases which are not affected by changes in the composition or activity thereof due to reaction in the catalyst.

On the other hand, immediately after a cold start, exhaust gases from the engine tend to be low in activity, so that the output from the upstream sensor tends to be not responsive enough. Therefore, in such a case, using the output value from the second oxygen concentration parameter sensor disposed on the downstream side as a reference, it is possible to determine the integrated values of the upstream and downstream oxygen concentration parameters which more accurately reflect oxygen concentrations, based on the results of detection by the second oxygen concentration parameter sensor for exhaust gases which are enhanced in activity due to reaction in the catalyst. Therefore, by comparing the thus corrected integrated values with each other, it is possible to further improve the accuracy of the determination.

As described above, when the output value from the second LAF sensor 13 disposed downstream of the catalyst 7 is used as a reference, it is possible to properly calculate the first and second reducing agent amount integrated values sumkact1 and sumkact2 and the oxygen storage capacity OSC, based on the output value from the second LAF sensor 13 indicative of the result of detection thereof performed on exhaust gases of which the activity is enhanced by the reaction in the catalyst 7, when the output from the first LAF sensor 12 disposed upstream of the catalyst 12 is not responsive enough due to low activity of exhaust gases e.g. immediately after a cold start of the engine.

Preferably, the catalyst deterioration-determining device further comprises steady state-determining means for determining whether or not the upstream oxygen concentration parameter and the downstream oxygen concentration parameter reach a steady state, and the predetermined period is a time period to elapse after switching of the exhaust gases before it is determined that both of the upstream oxygen concentration parameter and the downstream oxygen concentration parameter reach the steady state.

With the configuration of this preferred embodiment, the predetermined time period is defined as a time period to elapse after switching of the exhaust gases before it is determined that both of the upstream oxygen concentration parameter and the downstream oxygen concentration parameter reach the steady state. This makes it possible to properly correct the integrated values and the like, using the upstream and downstream oxygen concentration parameters which are detected after reaching the steady state and should have values equal to each other, which makes it possible to positively improve the accuracy of the determination.

To attain the above object, in a second aspect of the present invention, there is provided a catalyst deterioration-determining device that determines deterioration of an upstream catalyst disposed in an exhaust passage of an internal combustion engine, for purifying exhaust gases, the catalyst having an oxygen storage capability for storing oxygen, and determines deterioration of a downstream catalyst disposed downstream of the upstream catalyst in the exhaust passage, for purifying exhaust gases, the downstream catalyst having an oxygen storage capability for storing oxygen, comprising a first oxygen concentration parameter sensor that detects an upstream oxygen concentration parameter indicative of an oxygen concentration in exhaust gases on an upstream side of the catalyst, a second oxygen concentration parameter sensor that detects an intermediate oxygen concentration parameter indicative of an oxygen concentration in exhaust gases between the upstream catalyst and the downstream catalyst, a third oxygen concentration parameter sensor that detects a downstream oxygen concentration parameter indicative of an oxygen concentration in exhaust gases on a downstream side of the downstream catalyst, control means for controlling exhaust gases flowing into the catalyst by switching the exhaust gases between an oxidation atmosphere and a reduction atmosphere, correction means for correcting the upstream oxygen concentration parameter, the intermediate oxygen concentration parameter, and the downstream oxygen concentration parameter which are detected after the exhaust gases are switched by the control means, such that the upstream oxygen concentration parameter, the intermediate oxygen concentration parameter, and the downstream oxygen concentration parameter which are detected after lapse of a predetermined time period coincide with each other, and deterioration determination means for determining deterioration of the upstream catalyst and the downstream catalyst based on results of comparison between the upstream oxygen concentration parameter, the intermediate oxygen concentration parameter, and the downstream oxygen concentration parameter, which are corrected.

The second aspect of the present invention and preferred embodiments thereof described hereinafter are applications of the first aspect of the present invention and the preferred embodiments thereof described hereinbefore to a case where the engine has two catalysts, i.e. an upstream catalyst and a downstream catalyst disposed in an exhaust passage thereof. That is, with the configuration of this catalyst deterioration-determining device according to the second aspect of the present invention, the upstream catalyst and downstream catalyst are disposed in the exhaust passage of the engine, for purifying exhaust gases. Both the catalysts have an oxygen storage capability. According to the catalyst deterioration-determining device according to the present invention, the upstream oxygen concentration parameter, the intermediate oxygen concentration parameter, and the downstream oxygen concentration parameter which are indicative of respective oxygen concentrations in exhaust gases upstream of the upstream catalyst, between the upstream catalyst and the downstream catalyst, and downstream of the downstream catalyst are detected by the first to third oxygen concentration sensors, respectively. Before performing the deterioration determination, exhaust gases flowing into the upstream catalyst are switched between the oxidation atmosphere and the reduction atmosphere, and the upstream, intermediate and downstream oxygen concentration parameters detected after the switching of exhaust gases are corrected such that the upstream, intermediate and downstream oxygen concentration parameters detected after the lapse of the predetermined time period after the switching of exhaust gases coincide with each other.

By this correction, it is possible to appropriately compensate for differences in the output characteristics (gains) of the first to third oxygen concentration parameter sensors, if there occur the differences. Then, based on results of comparison between the corrected upstream, intermediate, and downstream oxygen concentration parameters with each other, the deterioration of the upstream and downstream catalysts is determined. Therefore, without being influenced by the differences in the output characteristics of the first to third oxygen concentration parameters, it is possible to perform an appropriate deterioration determination of both the catalysts, to thereby improve the accuracy of the determination.

Preferably, the catalyst deterioration-determining device further comprises integrated value-calculating means for calculating an integrated value of the upstream oxygen concentration parameter, an integrated value of the intermediate oxygen concentration parameter, and an integrated value of the downstream oxygen concentration parameter, and the correction means corrects the integrated value of the upstream oxygen concentration parameter, the integrated value of the intermediate oxygen concentration parameter, and the integrated value of the downstream oxygen concentration parameter, by calculating a ratio between the calculated integrated value of the upstream oxygen concentration parameter and the upstream oxygen concentration parameter detected after the lapse of the predetermined time period, a ratio between the calculated integrated value of the intermediate oxygen concentration parameter and the intermediate oxygen concentration parameter detected after the lapse of the predetermined time period, and a ratio between the calculated integrated value of the downstream oxygen concentration parameter and the downstream oxygen concentration parameter detected after the lapse of the predetermined time period, and the deterioration determining means determines the deterioration of the catalyst based on results of comparison between upstream oxygen concentration parameter, the intermediate oxygen concentration parameter, and the downstream oxygen concentration parameter which are corrected.

With the configuration of this preferred embodiment, similarly to the corresponding preferred embodiment of the first aspect of the present invention, as the upstream, intermediate, and downstream oxygen concentration sensors compared for the deterioration determination, the integrated values thereof are used. This makes it possible to appropriately accommodate influence of temporary fluctuation in the output values of the first to third oxygen concentration parameter sensors and errors thereof. Further, since the integrated values are corrected by calculating ratios between the respective integrated values and associated oxygen concentration parameters detected after the lapse of the predetermined time period, it is possible to appropriately compensate for the differences in the gains of the first to third oxygen concentration parameter sensors such that the upstream, intermediate and downstream oxygen concentration parameters detected after the lapse of the predetermined time period coincide with each other. Therefore, by comparing the integrated values subjected to gain correction with each other, it is possible to more appropriately determine the deterioration of the determination, to thereby further improve the accuracy of the determination.

More preferably, the correction means multiplies the corrected integrated values of the upstream oxygen concentration parameter, the intermediate oxygen concentration sensor, and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameters.

With the configuration of this preferred embodiment, similarly to the corresponding preferred embodiment of the first aspect of the present invention, as described above, by multiplying the corrected integrated values of the upstream, intermediate, and downstream oxygen concentration parameters, by one oxygen concentration parameter of the upstream, intermediate, and downstream oxygen concentration parameters detected after the lapse of the predetermined time period, the integrated values are subjected to gain correction with reference to the output value from the oxygen concentration sensor that detected the one oxygen concentration parameter. Therefore, by comparing the corrected integrated values with each other, it is possible to further improve the accuracy of the determination.

Preferably, the catalyst deterioration-determining device further comprises steady state-determining means for determining whether or not the upstream oxygen concentration parameter, the intermediate oxygen concentration parameter, and the downstream oxygen concentration parameter reach a steady state, and the predetermined period is a time period to elapse after switching of the exhaust gases before it is determined that all of the upstream oxygen concentration parameter, the intermediate oxygen concentration parameter, and the downstream oxygen concentration parameter reach the steady state.

With the configuration of this preferred embodiment, similarly to the corresponding preferred embodiment of the first aspect of the present invention, the predetermined time period is defined as a time period to elapse after switching of the exhaust gases before it is determined that all of the upstream oxygen concentration parameter, the intermediately oxygen concentration parameter, and the downstream oxygen concentration parameter reach the steady state. This makes it possible to properly correct the integrated values and the like, using the upstream, intermediate and downstream oxygen concentration parameters which are detected after reaching the steady state and should have values equal to each other, which makes it possible to positively improve the accuracy of the determination.

To attain the above object, in a third aspect of the present invention, there is provided a catalyst deterioration-determining method for determining deterioration of a catalyst disposed in an exhaust passage of an internal combustion engine, for purifying exhaust gases, the catalyst having an oxygen storage capability for storing oxygen, comprising detecting an upstream oxygen concentration parameter indicative of an oxygen concentration in exhaust gases on an upstream side of the catalyst, detecting a downstream oxygen concentration parameter indicative of an oxygen concentration in exhaust gases on a downstream side of the catalyst, controlling exhaust gases flowing into the catalyst by switching the exhaust gases between an oxidation atmosphere and a reduction atmosphere, correcting the upstream oxygen concentration parameter and the downstream oxygen concentration parameter which are detected after the exhaust gases are switched by the controlling, such that the upstream oxygen concentration parameter and the downstream oxygen concentration parameter which are detected after lapse of a predetermined time period coincide with each other, and determining deterioration of the catalyst based on results of comparison between the upstream oxygen concentration parameter and the downstream oxygen concentration parameter which are corrected.

With the configuration of the catalyst deterioration-determining method according to the third aspect of the present invention, it is possible to obtain the same advantageous effects as provided by the first aspect of the present invention.

Preferably, the catalyst deterioration-determining method further comprises calculating an integrated value of the upstream oxygen concentration parameter and an integrated value of the downstream oxygen concentration parameter, and the correcting includes correcting the integrated value of the upstream oxygen concentration parameter and the integrated value of the downstream oxygen concentration parameter, by calculating a ratio between the calculated integrated value of the upstream oxygen concentration parameter and the upstream oxygen concentration parameter detected after the lapse of the predetermined time period, and a ratio between the calculated integrated value of the downstream oxygen concentration parameter and the downstream oxygen concentration parameter detected after the lapse of the predetermined time period, the determining including determining the deterioration of the catalyst based on results of comparison between the corrected integrated value of the upstream oxygen concentration parameter and the corrected integrated value of the downstream oxygen concentration parameter.

More preferably, the correcting includes multiplying the corrected integrated values of the upstream oxygen concentration parameter and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameter.

Preferably, the catalyst deterioration-determining method further comprises determining whether or not the upstream oxygen concentration parameter and the downstream oxygen concentration parameter reach a steady state, and the predetermined period is a time period to elapse after switching of the exhaust gases before it is determined that both of the upstream oxygen concentration parameter and the downstream oxygen concentration parameter reach the steady state.

With the configurations of these preferred embodiments, it is possible to obtain the same advantageous effects as provided by the respective corresponding preferred embodiments of the first aspect of the present invention.

To attain the above object, in a fourth aspect of the present invention, there is provided a catalyst deterioration-determining method for determining deterioration of an upstream catalyst disposed in an exhaust passage of an internal combustion engine, for purifying exhaust gases, the catalyst having an oxygen storage capability for storing oxygen, and determining deterioration of a downstream catalyst disposed downstream of the upstream catalyst in the exhaust passage, for purifying exhaust gases, the downstream catalyst having an oxygen storage capability for storing oxygen, comprising detecting an upstream oxygen concentration parameter indicative of an oxygen concentration in exhaust gases on an upstream side of the catalyst, detecting an intermediate oxygen concentration parameter indicative of an oxygen concentration in exhaust gases between the upstream catalyst and the downstream catalyst, detecting a downstream oxygen concentration parameter indicative of an oxygen concentration in exhaust gases on a downstream side of the downstream catalyst, controlling exhaust gases flowing into the catalyst by switching the exhaust gases between an oxidation atmosphere and a reduction atmosphere, correcting the upstream oxygen concentration parameter, the intermediate oxygen concentration parameter, and the downstream oxygen concentration parameter which are detected after the exhaust gases are switched by the control means, such that the upstream oxygen concentration parameter, the intermediate oxygen concentration parameter, and the downstream oxygen concentration parameter which are detected after lapse of a predetermined time period coincide with each other, and determining deterioration of the upstream catalyst and the downstream catalyst based on results of comparison between the upstream oxygen concentration parameter, the intermediate oxygen concentration parameter, and the downstream oxygen concentration parameter, which are corrected.

With the configuration of the catalyst deterioration-determining method according to the fourth aspect of the present invention, it is possible to obtain the same advantageous effects as provided by the second aspect of the present invention.

Preferably, the catalyst deterioration-determining method further comprises calculating an integrated value of the upstream oxygen concentration parameter, an integrated value of the intermediate oxygen concentration parameter, and an integrated value of the downstream oxygen concentration parameter, and the correcting includes correcting the integrated value of the upstream oxygen concentration parameter, the integrated value of the intermediate oxygen concentration parameter, and the integrated value of the downstream oxygen concentration parameter, by calculating a ratio between the calculated integrated value of the upstream oxygen concentration parameter and the upstream oxygen concentration parameter detected after the lapse of the predetermined time period, a ratio between the calculated integrated value of the intermediate oxygen concentration parameter and the intermediate oxygen concentration parameter detected after the lapse of the predetermined time period, and a ratio between the calculated integrated value of the downstream oxygen concentration parameter and the downstream oxygen concentration parameter detected after the lapse of the predetermined time period, the determining including determining the deterioration of the catalyst based on results of comparison between upstream oxygen concentration parameter, the intermediate oxygen concentration parameter, and the downstream oxygen concentration parameter which are corrected.

More preferably, the correcting includes multiplying the corrected integrated values of the upstream oxygen concentration parameter, the intermediate oxygen concentration sensor, and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameters.

Preferably, the catalyst deterioration-determining method further comprises determining whether or not the upstream oxygen concentration parameter, the intermediate oxygen concentration parameter, and the downstream oxygen concentration parameter reach a steady state, and the predetermined period is a time period to elapse after switching of the exhaust gases before it is determined that all of the upstream oxygen concentration parameter, the intermediate oxygen concentration parameter, and the downstream oxygen concentration parameter reach the steady state.

With the configurations of these preferred embodiments, it is possible to obtain the same advantageous effects as provided by the respective corresponding preferred embodiments of the second aspect of the present invention.

To attain the above object, in a fifth aspect of the present invention, there is provided an engine control unit including a control program for causing a computer to execute a catalyst deterioration-determining method for determining deterioration of a catalyst disposed in an exhaust passage of an internal combustion engine, for purifying exhaust gases, the catalyst having an oxygen storage capability for storing oxygen, wherein the catalyst deterioration-determining method comprises detecting an upstream oxygen concentration parameter indicative of an oxygen concentration in exhaust gases on an upstream side of the catalyst, detecting a downstream oxygen concentration parameter indicative of an oxygen concentration in exhaust gases on a downstream side of the catalyst, controlling exhaust gases flowing into the catalyst by switching the exhaust gases between an oxidation atmosphere and a reduction atmosphere, correcting the upstream oxygen concentration parameter and the downstream oxygen concentration parameter which are detected after the exhaust gases are switched by the controlling, such that the upstream oxygen concentration parameter and the downstream oxygen concentration parameter which are detected after lapse of a predetermined time period coincide with each other, and determining deterioration of the catalyst based on results of comparison between the upstream oxygen concentration parameter and the downstream oxygen concentration parameter which are corrected.

With the configuration of the engine control unit according to the fifth aspect of the present invention, it is possible to obtain the same advantageous effects as provided by the first aspect of the present invention.

Preferably, the catalyst deterioration-determining method further comprises calculating an integrated value of the upstream oxygen concentration parameter and an integrated value of the downstream oxygen concentration parameter, and the correcting includes correcting the integrated value of the upstream oxygen concentration parameter and the integrated value of the downstream oxygen concentration parameter, by calculating a ratio between the calculated integrated value of the upstream oxygen concentration parameter and the upstream oxygen concentration parameter detected after the lapse of the predetermined time period, and a ratio between the calculated integrated value of the downstream oxygen concentration parameter and the downstream oxygen concentration parameter detected after the lapse of the predetermined time period, the determining including determining the deterioration of the catalyst based on results of comparison between the corrected integrated value of the upstream oxygen concentration parameter and the corrected integrated value of the downstream oxygen concentration parameter.

More preferably, the correcting includes multiplying the corrected integrated values of the upstream oxygen concentration parameter and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameter.

Preferably, the catalyst deterioration-determining method further comprises determining whether or not the upstream oxygen concentration parameter and the downstream oxygen concentration parameter reach a steady state, and the predetermined period is a time period to elapse after switching of the exhaust gases before it is determined that both of the upstream oxygen concentration parameter and the downstream oxygen concentration parameter reach the steady state.

With the configurations of these preferred embodiments, it is possible to obtain the same advantageous effects as provided by the respective corresponding preferred embodiments of the first aspect of the present invention.

To attain the above object, in a sixth aspect of the present invention, there is provided an engine control unit including a control program for causing a computer to execute a catalyst deterioration-determining method for determining deterioration of an upstream catalyst disposed in an exhaust passage of an internal combustion engine, for purifying exhaust gases, the catalyst having an oxygen storage capability for storing oxygen, and determining deterioration of a downstream catalyst disposed downstream of the upstream catalyst in the exhaust passage, for purifying exhaust gases, the downstream catalyst having an oxygen storage capability for storing oxygen, wherein the catalyst deterioration-determining method comprises detecting an upstream oxygen concentration parameter indicative of an oxygen concentration in exhaust gases on an upstream side of the catalyst, detecting an intermediate oxygen concentration parameter indicative of an oxygen concentration in exhaust gases between the upstream catalyst and the downstream catalyst, detecting a downstream oxygen concentration parameter indicative of an oxygen concentration in exhaust gases on a downstream side of the downstream catalyst, controlling exhaust gases flowing into the catalyst by switching the exhaust gases between an oxidation atmosphere and a reduction atmosphere, correcting the upstream oxygen concentration parameter, the intermediate oxygen concentration parameter, and the downstream oxygen concentration parameter which are detected after the exhaust gases are switched by the control means, such that the upstream oxygen concentration parameter, the intermediate oxygen concentration parameter, and the downstream oxygen concentration parameter which are detected after lapse of a predetermined time period coincide with each other, and determining deterioration of the upstream catalyst and the downstream catalyst based on results of comparison between the upstream oxygen concentration parameter, the intermediate oxygen concentration parameter, and the downstream oxygen concentration parameter, which are corrected.

With the configuration of the engine control unit according to the sixth aspect of the present invention, it is possible to obtain the same advantageous effects as provided by the second aspect of the present invention.

Preferably, an engine control unit as claimed in claim 21, wherein the catalyst deterioration-determining method further comprises calculating an integrated value of the upstream oxygen concentration parameter, an integrated value of the intermediate oxygen concentration parameter, and an integrated value of the downstream oxygen concentration parameter, and the correcting includes correcting the integrated value of the upstream oxygen concentration parameter, the integrated value of the intermediate oxygen concentration parameter, and the integrated value of the downstream oxygen concentration parameter, by calculating a ratio between the calculated integrated value of the upstream oxygen concentration parameter and the upstream oxygen concentration parameter detected after the lapse of the predetermined time period, a ratio between the calculated integrated value of the intermediate oxygen concentration parameter and the intermediate oxygen concentration parameter detected after the lapse of the predetermined time period, and a ratio between the calculated integrated value of the downstream oxygen concentration parameter and the downstream oxygen concentration parameter detected after the lapse of the predetermined time period, the determining including determining the deterioration of the catalyst based on results of comparison between upstream oxygen concentration parameter, the intermediate oxygen concentration parameter, and the downstream oxygen concentration parameter which are corrected.

More preferably, the correcting includes multiplying the corrected integrated values of the upstream oxygen concentration parameter, the intermediate oxygen concentration sensor, and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameters.

Preferably, the catalyst deterioration-determining method further comprises determining whether or not the upstream oxygen concentration parameter, the intermediate oxygen concentration parameter, and the downstream oxygen concentration parameter reach a steady state, and the predetermined period is a time period to elapse after switching of the exhaust gases before it is determined that all of the upstream oxygen concentration parameter, the intermediate oxygen concentration parameter, and the downstream oxygen concentration parameter reach the steady state.

With the configurations of these preferred embodiments, it is possible to obtain the same advantageous effects as provided by the respective corresponding preferred embodiments of the second aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
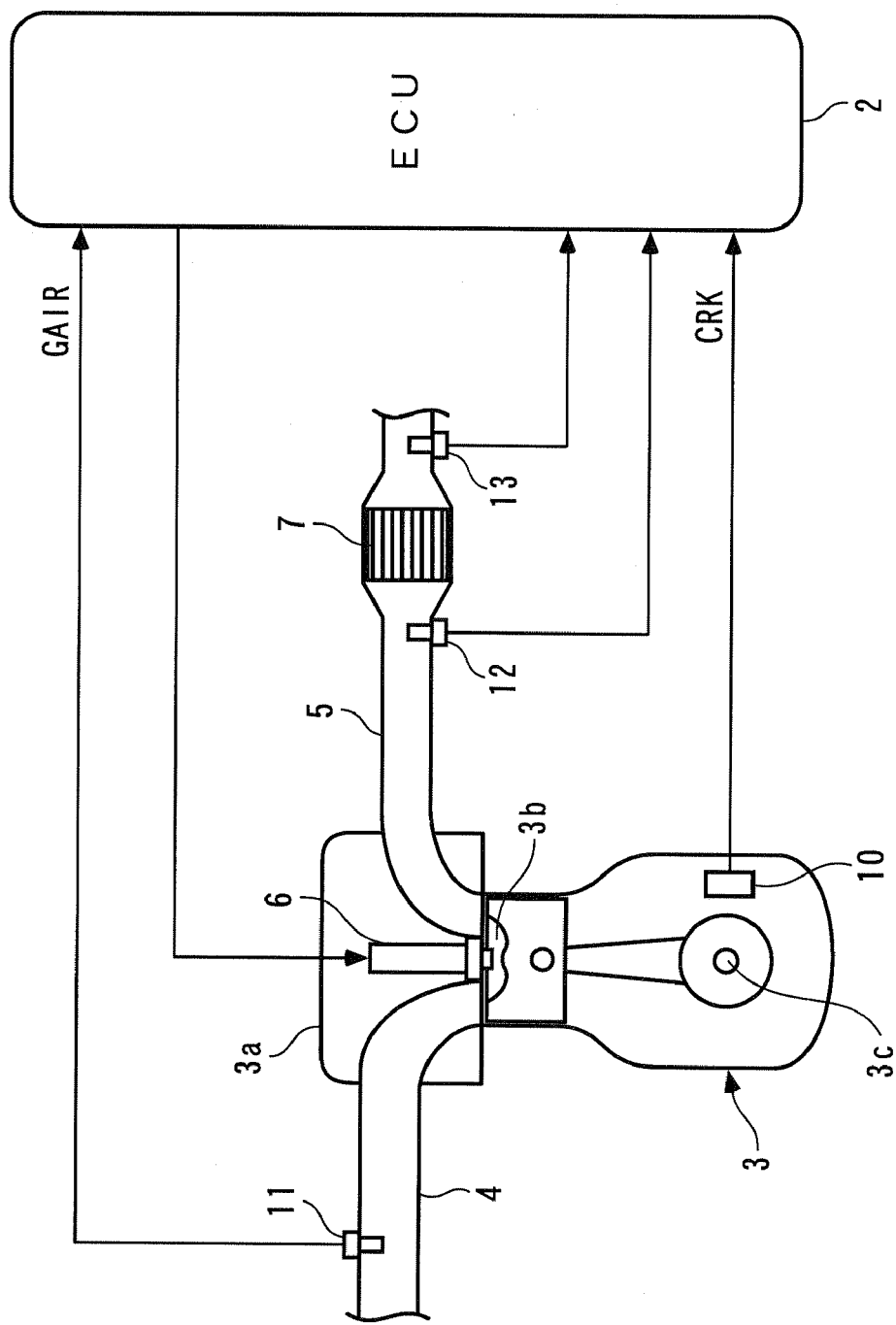
FIG. 1 is a schematic diagram of a catalyst deterioration-determining device according to a first embodiment of the present invention, and an internal combustion engine to which the catalyst deterioration-determining device is applied.

The invention will now be described in detail with reference to the drawings showing preferred embodiments thereof. FIG. 1 schematically shows a catalyst deterioration determination device 1 according to a first embodiment of the present invention, and an internal combustion engine 3 to which the catalyst deterioration determination device 1 is applied. The internal combustion engine (hereinafter simply referred to as "the engine") 3 is a diesel engine that is installed on a vehicle, not shown.

A cylinder head 3$a$ of the engine 3 has an intake pipe 4 and an exhaust pipe 5 connected thereto, with a fuel injection valve (hereinafter referred to as "the injector") 6 mounted therethrough such that it faces a combustion chamber 3$b$. The injector 6 is inserted into the combustion chamber 3$b$ through a central portion of the top wall thereof, and injects fuel from a fuel tank (not shown) into the combustion chamber 3$b$. The amount (fuel injection amount) of fuel to be injected from the injector 6 is set by an ECU 2, referred to hereinafter, and is controlled by controlling a valve-opening time period of the injector 6 by a drive signal from the ECU 2.

The engine 3 has a crank angle sensor 10. The crank angle sensor 10 delivers a CRK signal, which is a pulse signal, to the ECU 2 in accordance with rotation of the crankshaft 3$c$. The CRK signal is delivered whenever the crankshaft rotates through a predetermined angle (e.g. 30°). The ECU 2 calculates the rotational speed NE of the engine 3 (hereinafter referred to as "the engine speed NE") based on the CRK signal.

Further, the intake pipe 4 has an air flow sensor 11 inserted therein, which detects the amount (intake air amount) GAIR of intake air sucked into the engine 3, and delivers a signal indicative of the sensed intake air amount GAIR to the ECU 2.

A catalyst 7 is disposed in the exhaust pipe 5. The catalyst 7 is formed by a three-way catalyst, and purifies HC, CO and NOx in the exhaust gases by oxidation-reduction reaction. Further, the catalyst 7 has an oxygen storage capability, and if exhaust gases form an oxidation atmosphere in which the oxygen concentration is high, the catalyst 7 stores oxygen in the exhaust gases. On the other hand, if exhaust gases form a reduction atmosphere in which the oxygen concentration is low, the catalyst 7 releases the stored oxygen.

A first LAF sensor 12 and a second LAF sensor 13 are provided in the exhaust pipe 5 at respective locations upstream and downstream of the catalyst 7. The first and second LAF sensors 12 and 13, which are comprised of zirconia, linearly detect oxygen concentration in exhaust gases over a wide range of the air-fuel ratio from a richer region than the stoichiometric air-fuel ratio to a leaner region than the stoichiometric air-fuel ratio. The first LAF sensor 12 detects oxygen concentration (hereinafter referred to as "the upstream oxygen concentration") in exhaust gases on the upstream side of the catalyst 7, and the second LAF sensor 13 detects oxygen concentration (hereinafter referred to as "the downstream oxygen concentration") in exhaust gases on the downstream side of the catalyst 7. Signals indicative of the respective detected oxygen concentrations are delivered to the 4 ECU 2.

The ECU 2 calculates a first equivalent ratio KACT1 obtained by conversion of a mass ratio (fuel-air ratio) between reducing agents (unburned fuel) and oxygen in exhaust gases on the upstream side of the catalyst 7, based on the detection signal from the first LAF sensor 12. In this case, the first equivalent ratio KACT1 is calculated as a ratio between a fuel-air ratio and the stoichiometric fuel-air ratio of a mixture of fuel and air. As a result, when the upstream oxygen concentration is equivalent to the stoichiometric fuel-air ratio, the first equivalent ratio KACT1 is equal to 1.0, whereas when the upstream oxygen concentration is smaller than a value which is equivalent to the stoichiometric fuel-air ratio, i.e. when the exhaust gases form a reduction atmosphere, the first equivalent ratio KACT1 is larger than 1.0. Further, when the upstream oxygen concentration is higher than a value which is equivalent to the stoichiometric fuel-air ratio, i.e. when the exhaust gases form an oxidation atmosphere, the first equivalent ratio KACT1 is smaller than 1.0.

Similarly, the ECU 2 calculates a second equivalent ratio KACT2 obtained by conversion of a mass ratio (fuel-air ratio) between reducing agents (unburned fuel) and oxygen in exhaust gases on the downstream side of the catalyst 7, based on the detection signal from the second LAF sensor 13.

The ECU 2 is implemented by a microcomputer comprised of a CPU, a RAM, a ROM, and an I/O interface (none of which is shown). The ECU 2 determines operating conditions of the engine 3 according to the detection signals from the aforementioned sensors 10 to 13 and carries out various control processes, such as the control of the fuel injection amount, and the deterioration determination process for determining deterioration of the catalyst 7, according to the determined operating conditions of the engine. It should be noted that in the present embodiment, the ECU 2 corresponds to control means, correction means, deterioration determining means, integrated value-calculating means, and steady state-determining means in the present invention.

Figure 2:
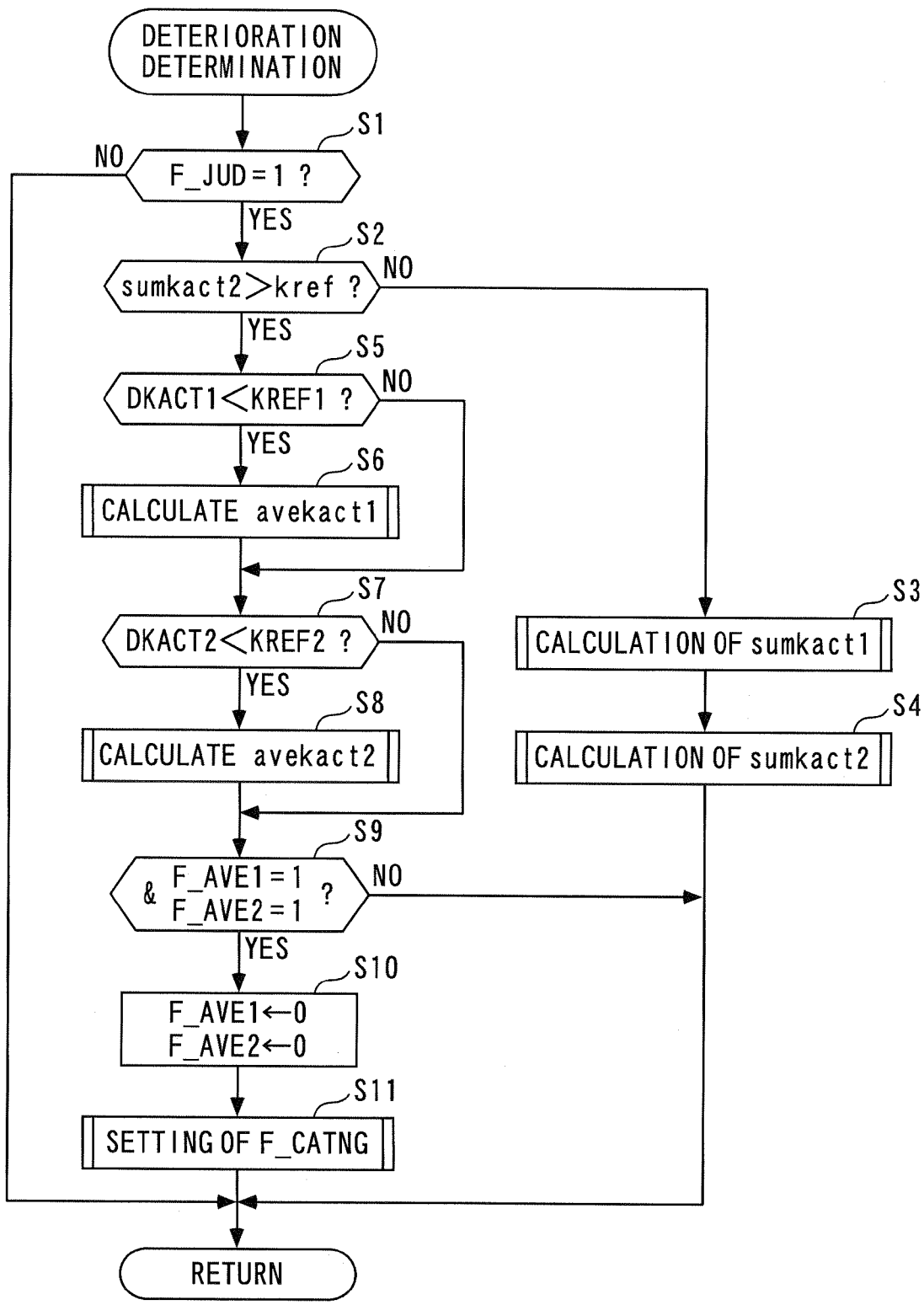
FIG. 2 is a flowchart of a deterioration determination process executed by the catalyst deterioration-determining device according to the first embodiment.

FIG. 2 is a flowchart of this deterioration determination process for determining deterioration of the catalyst 7. The present process is executed at predetermined intervals (e.g. of 10 msec). Further, when the deterioration determination process is carried out, the air-fuel ratio control of the mixture as is carried out in the following manner: Since the engine 3 is a diesel engine, it is usually operated by lean operation in which the air-fuel ratio is controlled to a leaner value than the stoichiometric air-fuel ratio by the fuel injection amount control by the ECU 2, whereby exhaust gases are controlled to the oxidation atmosphere in which the first equivalent ratio KACT1 is smaller than 1.0. When performing the deterioration determination process, the air-fuel ratio of the engine 3 is controlled from this state to a richer value than the stoichiometric air-fuel ratio, whereby the exhaust gases are controlled to a reduction atmosphere in which the first equivalent ratio KACT1 is controlled to a value larger than 1.0. The control of switching exhaust gases from the oxidation atmosphere to the reduction atmosphere and maintaining exhaust gases in this state is hereinafter referred to as "the exhaust gas reduction control". The deterioration determination process is carried out on condition that the engine 3 is in a predetermined stable operating condition, and the ECU 2 and the sensors 10 to 13 are normally operating.

Referring to FIG. 2, first, in a step 1 (shown as S1 in abbreviated form in FIG. 2; the following steps are also shown in abbreviated form), it is determined whether or not a judgment condition satisfaction flag F_JUD is equal to 1. The judgment condition satisfaction flag F_JUD is set to 1 during the exhaust gas reduction control when the conditions for determining deterioration of the catalyst 7 are satisfied. If the answer to the question of the step 1 is negative (NO), the present process is immediately terminated.

On the other hand, if the answer to the question of the step 1 is affirmative (YES), which means that the conditions for determining the deterioration of the catalyst 7 are satisfied, it is determined whether or not a second reducing agent amount integrated value sumkact2, referred to hereinafter, is larger than a predetermined value kref (step 2). If the answer to the question of the step 2 is negative (NO), a first reducing agent amount integrated value sumkact1 and the second reducing agent amount integrated value sumkact2 are calculated (steps 3 and 4), followed by terminating the present program. Here, the first reducing agent amount integrated value sumkact1 represents a total amount of reducing agents flowing into the catalyst 7 during the exhaust gas reduction control while the second reducing agent amount integrated value sumkact2 represents a total amount of reducing agents flowing through the catalyst during the exhaust gas reduction control (see FIG. 6).

Figure 3:
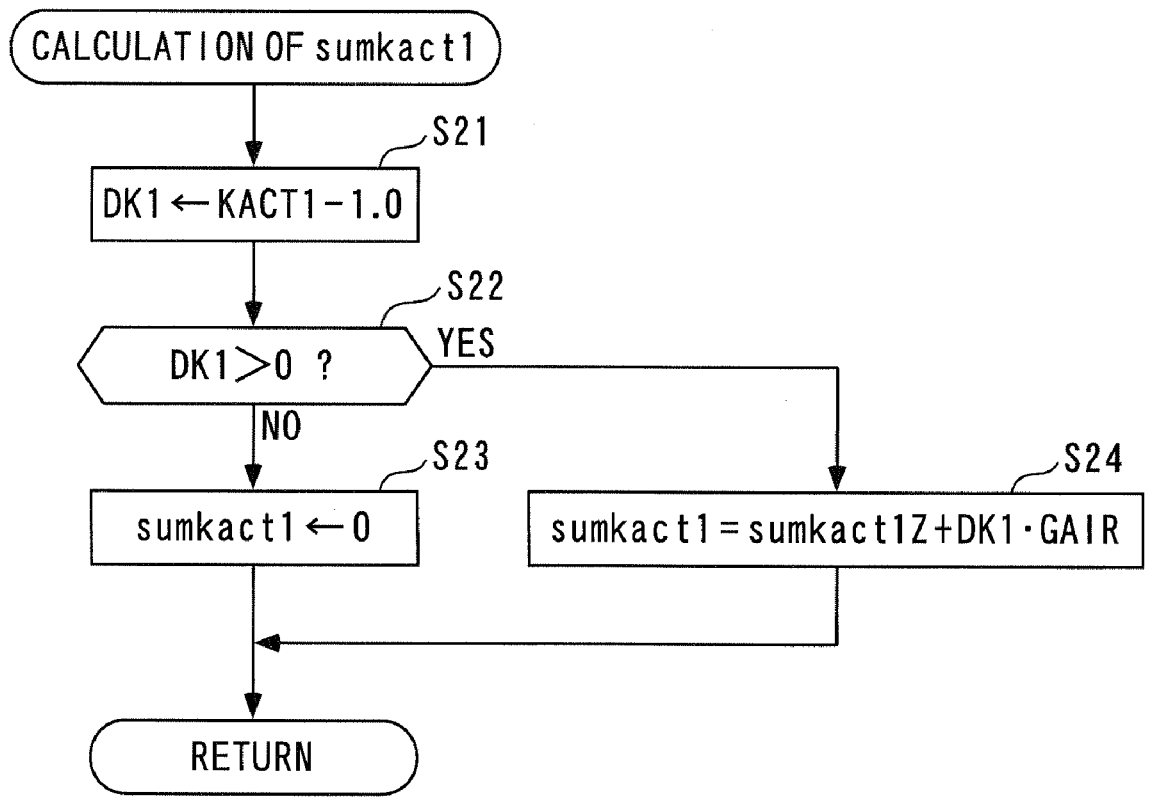
FIG. 3 is a subroutine showing a process for calculating a first reducing agent amount integrated value.

FIG. 3 is a subroutine for a process for calculating the first reducing agent amount integrated value sumkact1. In this process, first, in a step 21, the difference between the first equivalent ratio KACT1 and 1.0 (=KACT1−1.0) is calculated as a first difference DK1. Next, it is determined whether or not the first difference KD1 is larger than 0 (step 22). If the answer to this question is negative (NO), the first reducing agent amount integrated value sumkact1 is rest to 0 (step 23), followed by terminating the present program. On the other hand, if the answer to the question of the step S22 is affirmative (YES), using the first difference DK1 and the intake air amount GAIR, the first reducing agent amount integrated value sumkact1 is calculated by the following equation (1):

$$\text{sumkact1} = \text{sumkact1}Z + DK1 \cdot GAIR \quad (1)$$

In this equation, sumkact1Z represents the immediately preceding value of the first reducing agent amount integrated value (step 24), followed by terminating the present process.

As described above, the first reducing agent amount integrated value sumkact1 is calculated by integrating the product of the first difference DK1 and the intake air amount GAIR, when DK1>0 holds, i.e. KACT1>1.0 holds, and hence it corresponds to a total amount of reducing agents flowing into the catalyst 7 during the exhaust gas reduction control.

Figure 4:
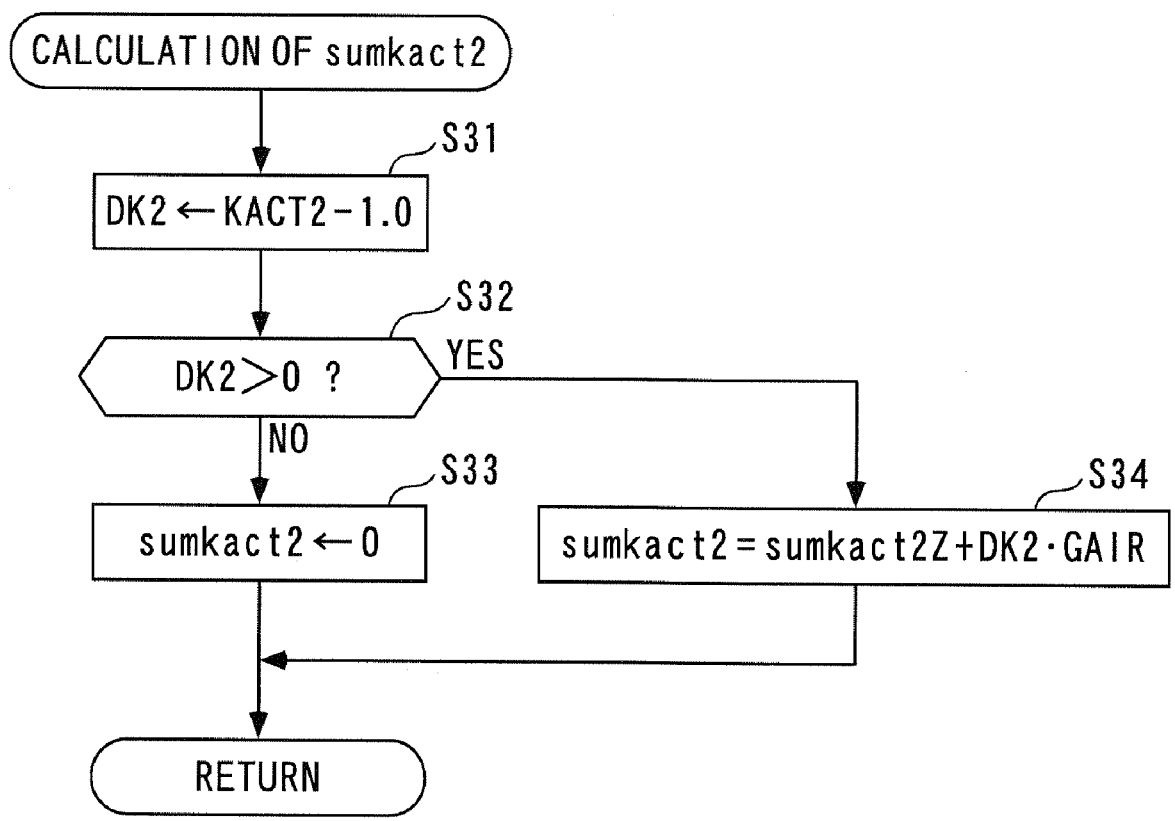
FIG. 4 is a subroutine showing a process for calculating a second reducing agent amount integrated value.

FIG. 4 is a subroutine for a process for calculating the second reducing agent amount integrated value sumkact2. In this process, first, in a step 31, the difference between the second equivalent ratio KACT2 and 1.0 (=KACT2−1.0) is calculated as a second difference DK2. Then, it is determined whether or not the second difference DK2 is larger than 0.

If the answer to this question is negative (NO), the second reducing agent amount calculated value sumkact2 is reset to 0 (step 33), followed by terminating the present process. On the other hand, if he answer to the question of the step 32 is affirmative (YES), using the second difference DK2 and the intake air amount GAIR, the second reducing agent amount integrated value sumkact2 is calculated by the following equation (2):

$$sumkact2 = sumkact2Z + DK2 \cdot GAIR \quad (2)$$

In this equation, sumkact2Z represents the immediately preceding value of the second reducing agent amount integrated value (step 34), followed by terminating the present process.

As described above, the second reducing agent amount integrated value sumkact1 is calculated by integrating the product of the second difference DK2 and the intake air amount GAIR, when DK2>0 holds, i.e. KACT2>1.0 holds, and hence it corresponds to a total amount of reducing agents flowing through the catalyst 7 during the exhaust gas reduction control.

Referring back to FIG. 2, if the answer to the question of the step 2 is affirmative (YES), i.e. the second reducing agent amount integrated value sumkact2>the predetermined value kref holds, it is judged that the amount of reducing agents flowing through the catalyst 7 is large, which causes oxygen stored in the catalyst 7 to be completely consumed by reaction with reducing agents in the exhaust gases flowing into the catalyst 7, and hence it is determined whether or not a first equivalent ratio change amount DKACT1 is smaller than a predetermined value KREF1 (step 5). The first equivalent ratio change amount DKACT1 is calculated as the absolute value of the difference between the present value and the immediately preceding value of the first equivalent ratio (=|KACT1−KACT1Z|). If the answer to this question is negative (NO), it is judged that the first equivalent ratio KACT1 has not reached the steady state, and the present process proceeds to a step 7, referred to hereinafter.

On the other hand, if the answer to the question of the step 5 is affirmative (YES), it is judged that the first equivalent ratio KACT1 has reached the steady state, which means lapse of a predetermined time period, so that an average value avekact1 of the first equivalent ratio KACT1 (hereinafter referred to as "the first equivalent ratio average value") is calculated (step 6), and then the process proceeds to a step 7. The first equivalent ratio average value avekact1 is calculated in the following manner:

The first equivalent ratio KACT1 obtained after satisfaction of DKACT1<KREF1 is sampled in each control timing, and when the number of times of the sampling reaches a predetermined value n (e.g. 100), the n sampled values of the first equivalent ratio KACT1 are averaged (arithmetic mean thereof is calculated) to thereby calculate the first equivalent ratio average value avekact1. Further, when the calculation of the first equivalent ratio average value avekact1 is completed, to indicate this fact, a first averaging computation completion flag F_AVE1 is set to 1.

In the step 7 following the step 5 or 6, it is determined whether or not a second equivalent ratio change amount DKACT2 is smaller than a predetermined value KREF2. The second equivalent ratio change amount DKACT2 is calculated as the absolute value of the difference between the present value and the immediately preceding value of the second equivalent ratio (=|KACT2−KACT2Z|). If the answer to this question is negative (NO), it is judged that the second equivalent ratio KACT2 has not reached the steady state, and the present process proceeds to a step 9, referred to hereinafter.

On the other hand, if the answer to the question of the step 7 is affirmative (YES), it is judged that the second equivalent ratio KACT2 has reached the steady state, which means the predetermined time period has elapsed, so that an average value avekact2 of the second equivalent ratio KACT2 (hereinafter referred to as "the second equivalent ratio average value") is calculated (step 8), and then the process proceeds to the step 9. The second equivalent ratio average value avekact2 is calculated in the following manner:

The second equivalent ratio KACT2 obtained after satisfaction of DKACT2<KREF2 is sampled in each control timing, and when the number of times of the sampling reaches the aforementioned predetermined value n, the n sampled values of the second equivalent ratio KACT2 are averaged (arithmetic mean thereof is calculated) to thereby calculate the second equivalent ratio average value avekact2. Further, when the calculation of the second equivalent ratio average value avekact2 is completed, to indicate this fact, a second averaging computation completion flag F_AVE2 is set to 1.

In the step 9 following the step 7 or 8, it is determined whether or not the firs and second averaging computation completion flags F_AVE1 and F_AVE2 are both equal to 1. If the answer to this question is negative (NO), i.e. if the calculation of at least one of the first and second equivalent ratio average values avekact1 and avekact2 has not been completed, the present process is immediately terminated.

On the other hand, if the answer to the question of this determination is affirmative (YES), i.e. if the calculation of both the first and second equivalent ratio average values avekact1 and avekact2 has been completed, both the first and second averaging computation completion flags F_AVE1 and F_AVE2 are both reset to 0, and then a process of setting a catalyst deterioration flag F_CATNG is executed (step 11), followed by terminating the present process.

Figure 5:
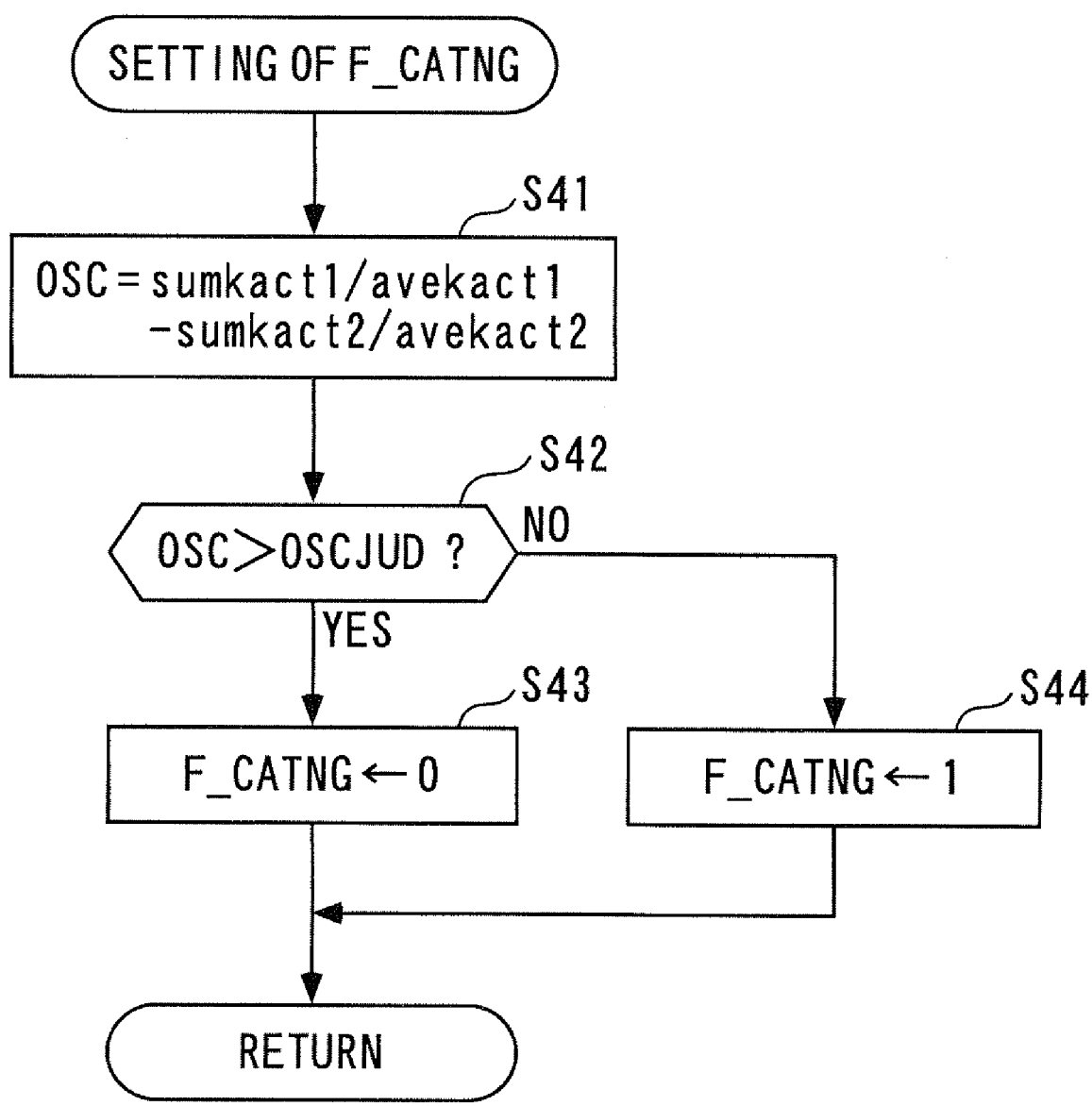
FIG. 5 is a subroutine showing a process for setting a catalyst deterioration flag.

FIG. 5 is a subroutine showing a process for setting the catalyst deterioration flag F_CATNG. In the present process, first, in a step 41, using the first and second reducing agent integrated values sumkact1 and sumkact2 and the first and second equivalent ratio average values avekact1 and avekact2, an oxygen storage capability OSC is calculated by the following equation (3):

$$OSC = \frac{sumkact1}{avekact1} - \frac{sumkact2}{avekact2} \quad (3)$$

Figure 6:
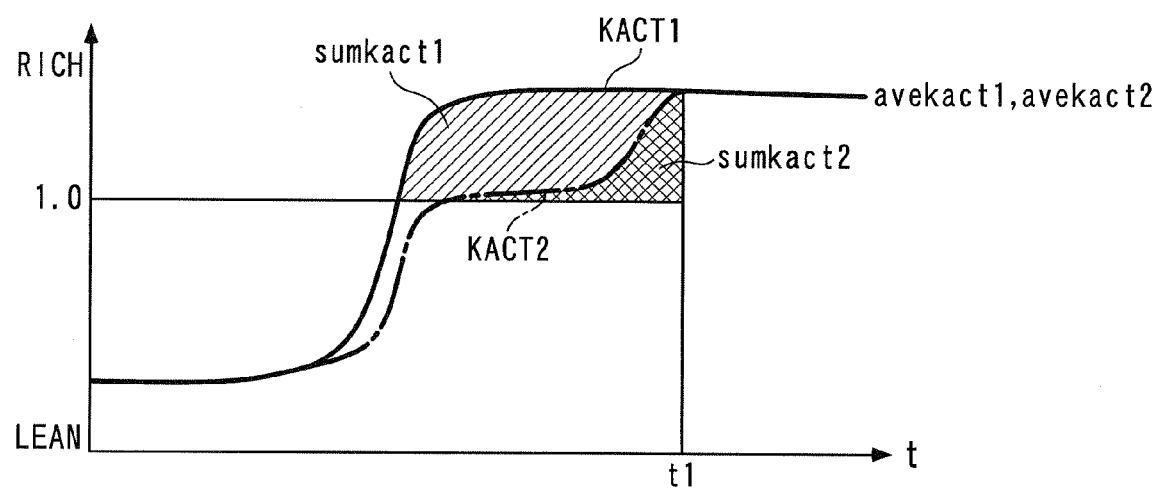
FIG. 6 is a timing diagram showing an example of operations of first and second LAF sensor performed under exhaust gas reduction control when there is no difference between gains thereof.

The oxygen storage capability OSC represents an oxygen storage capability of the catalyst 7, and the equation (3) is used for the calculation for the following reason: FIG. 6 shows an example of operations of the first and second LAF sensor 12 and 13 performed under the exhaust gas reduction control when there is no difference between the gains thereof. In FIG. 6, t1 indicated a timing in which the second reducing agent amount integrated value sumkact2 exceeds the predetermined value kref. As mentioned hereinbefore, the first reducing agent amount integrated value sumkact1 represents a total amount of reducing agents flowing into the catalyst 7 during the exhaust gas reduction control, and the second reducing agent amount integrated value sumkact2 represents a total amount of reducing agents flowing through the catalyst 7 during the exhaust gas reduction control. Therefore, the difference between the two values represents a total amount of reducing agents oxidized by oxygen stored in the catalyst 7 when exhaust gases forming the reduction atmosphere flow through the catalyst 7, that is, it corresponds to the oxygen storage capability OSC. Therefore, in the case whether the first and second LAF sensor 12 and 13 have the same gain, the oxygen storage capability OSC is represented by the following equation (4):

$$OSC = sumkact1 - sumkact2 \quad (4)$$

Figure 7:
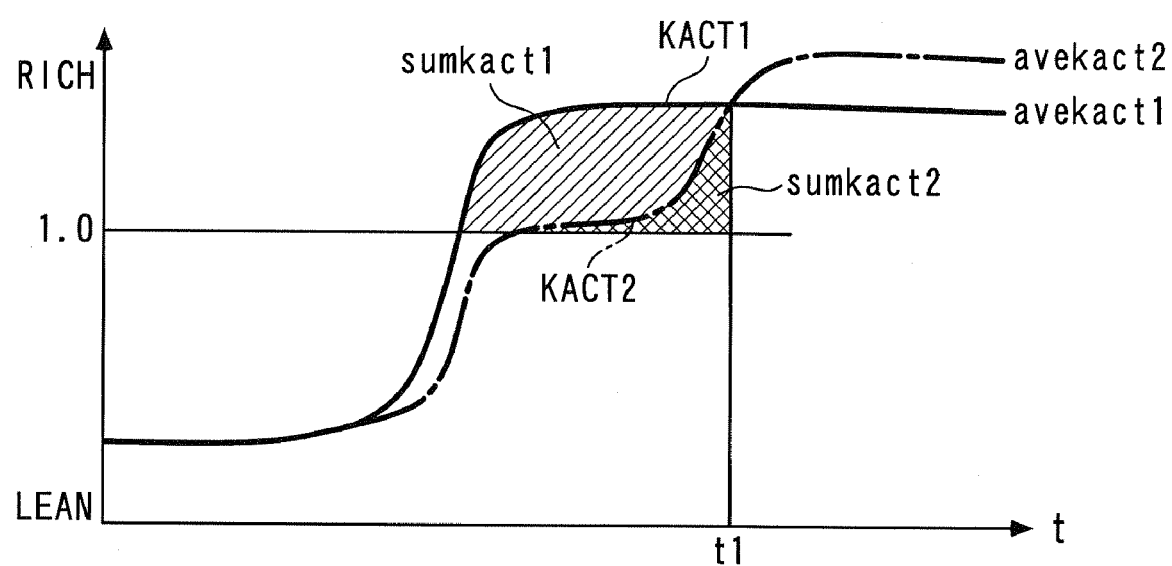
FIG. 7 is a timing diagram showing an example of operations of first and second LAF sensors performed under exhaust gas reduction control when there is a difference in the gains thereof.

On the other hand, if the first and second LAF sensor 12 and 13 have different gains, and for example, if the latter sensor 13 has a larger gain, as shown in FIG. 7, the second equivalent ratio KACT2 has a steeper slope and rises earlier, so that a value of the oxygen storage capacity OSC calculated by the equation (4) becomes smaller than it actually is. In this case, the first and second equivalent ratio average values avekact1 and avekact2 are respective average values of the first and second equivalent ratios KACT1 and KACT2 after they reach the steady state, and they should coincide with each other, as shown in FIG. 6. However, if they do not coincide with each other, they are calculated as respective values different from each other, in a manner corresponding to the difference between the respective magnitudes of gains of the first and second LAF sensors 12 and 13.

Therefore, a ratio between the first reducing agent amount integrated value sumkact1 and the first equivalent ratio average value avekact1 of the first term of the equation (3) and a ratio between the second reducing agent amount integrated value sumkact2 and the second equivalent ratio average value avekact2 of the second term of the same correspond to values obtained by correcting the first recuing agent amount integrated value sumkact1 and the second reducing agent amount integrated value sumkact2 such that the gains of the first and second LAF sensors 12 and 13 coincide with each other. Thus, according to the equation (3), the oxygen storage capability OSC is calculated by as the difference between the first reducing agent amount integrated value sumkact1 and the second reducing agent amount integrated value sumkact2 which are thus subjected to gain correction, and hence it is possible to appropriately determine the oxygen storage capability OSC while compensating for the difference between the gains of the two LAF sensors 12 and 13.

Then, in a step 42 following the step 42, it is determined whether or not the oxygen storage capability OSC calculated as above is larger than a predetermined reference value OSC-JUD. If the answer to this question is affirmative (YES), it is judged that the catalyst 7 is not deteriorated and to indicate this fact, the catalyst deterioration flag F_CATNG is set to 0 (step 43), followed by terminating the present process.

On the other hand, if the answer to the question of the step S42 is negative (NO), it is judged that the catalyst 7 is deteriorated, and to indicate this, the catalyst deterioration flag F_CATNG is set to 1 (step 44), followed by terminating the present process.

As described above, according to the present embodiment, the total amount of reducing agents flowing into the catalyst 7 during the exhaust gas reduction control in which the exhaust gases are in a state switched from the oxidation atmosphere to the reduction atmosphere is calculated as the first reducing agent amount integrated value sumkact1, and the total amount of reducing agents flowing through the catalyst 7 during the same is calculated as the second reducing agent amount integrated value sumkact2. Further, the first and second equivalent ratio average values avekact1 and avekact2 respectively indicative of the first and second equivalent ratios KACT2 after they reach the steady state are calculated.

Then, by the equation (3), the ratio between the first reducing agent amount integrated value sumkact1 and the first equivalent ratio avekact1 and the ratio between the second reducing agent amount integrated value sumkact2 and the second equivalent ration avekact2 are calculated to thereby subject the first reducing agent amount integrated value sumkact1 and the second reducing agent amount integrated value sumkact2 to gain correction, and then the oxygen storage capability OSC is calculated as the difference between the first reducing agent integrated value sumkact1 and the second reducing agent integrated value sumkact2 after the gain correction. Therefore, it is possible to properly calculate the oxygen storage capability OSC while compensating for the difference between the gains of the first and second LAF sensors 12 and 13. As a result, without being adversely affected by the difference between the gains of the first and second LAF sensors 12 and 13, it is possible to appropriately determine deterioration of the catalyst 7 based on the calculated oxygen storage capability OSC, thereby improve the accuracy of the determination.

Further, since the oxygen storage capability OSC is calculated as the difference between the first and second reducing agent integrated values sumkact1 and sumkact2, it is possible to properly accommodate the adverse influence of the temporary fluctuations or errors in the output values from the first and second LAF sensors 12 and 13, whereby it is possible to further improve the accuracy of the determination.

Figure 8:
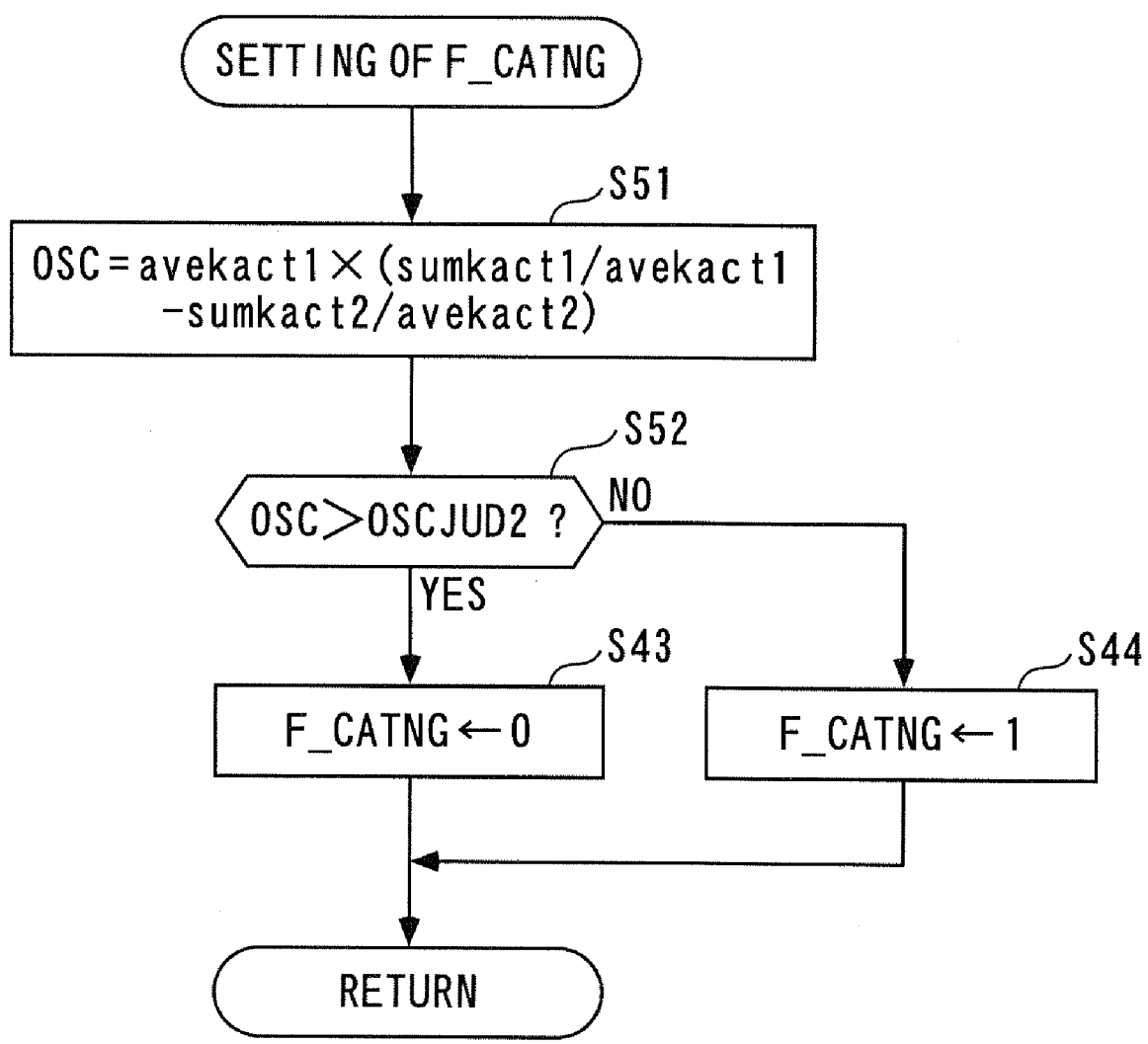
FIG. 8 is a subroutine showing a variation of the process for setting the catalyst deterioration flag.
Figure 9:
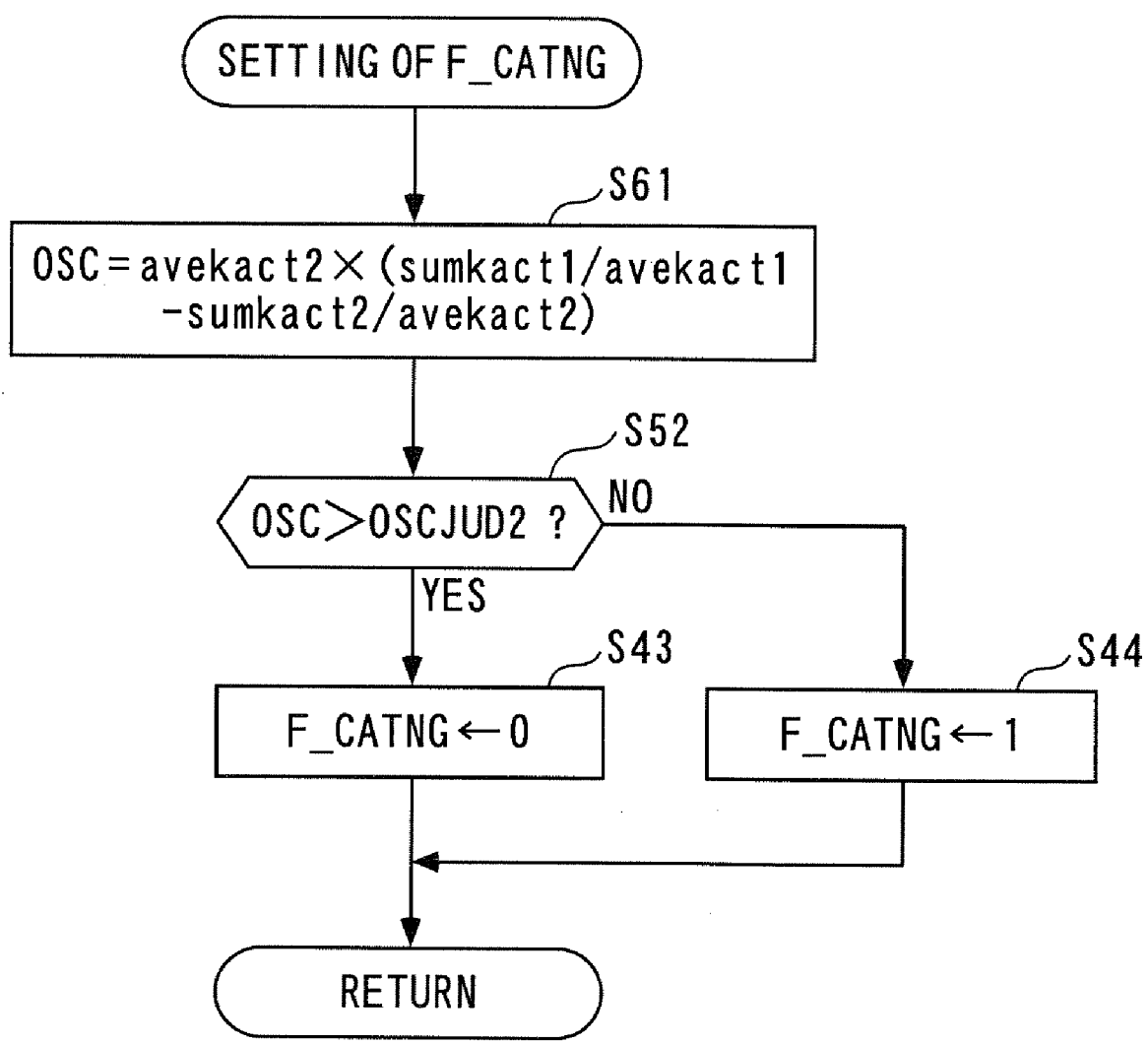
FIG. 9 is a subroutine showing another variation of the process for setting the catalyst deterioration flag.

FIGS. 8 and 9 show two variations of the process for setting the catalyst deterioration flag F_CATNG executed in place of the FIG. 5 process. These variations are different in the method of calculation of the oxygen storage capability OSC of the catalyst 7.

In the variation shown in FIG. 8, the oxygen storage capability OSC of the catalyst 7 is calculated by the following equation (5) (step 51):

$$OSC = avekact1 \left( \frac{sumkact1}{avekact1} - \frac{sumkact2}{avekact2} \right) \quad (5)$$

This equation (5) is formed by adding a multiplication term of the first equivalent ratio average value avekact1 to the right side of the equation (3), and can be rewritten as the following equation (6):

$$OSC = sumkact1 - \frac{avekact1}{avekact2} \cdot sumkact2 \quad (6)$$

From this, it is clear that the oxygen storage capability OSC is calculated by subjecting the second reducing agent amount integrated value sumkact2 to a gain correction with reference to the output value from the first LAF sensor 12.

Then, it is determined whether or not the calculated oxygen storage capacity OSC is larger than a predetermined reference value OSCJUD2 (step 52), and depending on the result of the determination, the catalyst deterioration flag F_CATNG is set to 0 or 1 (step 43 or 44), followed by terminating the present process.

As described above, when the output value from the first LAF sensor 12 disposed upstream of the catalyst 7 is used as a reference, it is possible to properly calculate the first and second reducing agent amount integrated values sumkact1 and sumkact2 and the oxygen storage capacity OSC, based on the output value from the first LAF sensor 12 indicative of the result of detection thereof performed on exhaust gases of which the composition or activity is not changed by reaction in the catalyst 7.

Further, in the variation shown in FIG. 9, inversely to the above, the oxygen storage capability OSC of the catalyst 7 is calculated with reference to the output value from the second LAF sensor 13, and it is calculated by the following equation (7) (step 61):

$$OSC = avekact2\left(\frac{sumkact1}{avekact1} - \frac{sumkact2}{avekact2}\right) \quad (7)$$

This equation (7) is formed by adding a multiplication term of the second equivalent ratio average value avekact2 to the right side of the equation (3), and can be rewritten as the following equation (8):

$$OSC = \frac{avekact2}{avekact1} \cdot sumkact1 - sumkact2 \quad (8)$$

From this, it is clear that the oxygen storage capability OSC is calculated by subjecting the first reducing agent amount integrated value sumkact1 to a gain correction with reference to the output value from the second LAF sensor 13.

As described above, when the output value from the second LAF sensor 13 disposed downstream of the catalyst 7 is used as a reference, it is possible to properly calculate the first and second reducing agent amount integrated values sumkact1 and sumkact2 and the oxygen storage capacity OSC, based on the output value from the second LAF sensor 13 indicative of the result of detection thereof performed on exhaust gases of which the activity is enhanced by the reaction in the catalyst 7, when the output from the first LAF sensor 12 disposed upstream of the catalyst 12 is not responsive enough due to low activity of exhaust gases e.g. immediately after a cold start of the engine.

Next, a catalyst deterioration determination device 21 according to a second embodiment of the present invention will be described with reference to FIGS. 10 to 13. It should be noted that component elements and steps of control processes identical to those of the first embodiment describe above are denoted by the same reference numerals, and detailed description thereof is omitted.

Figure 10:
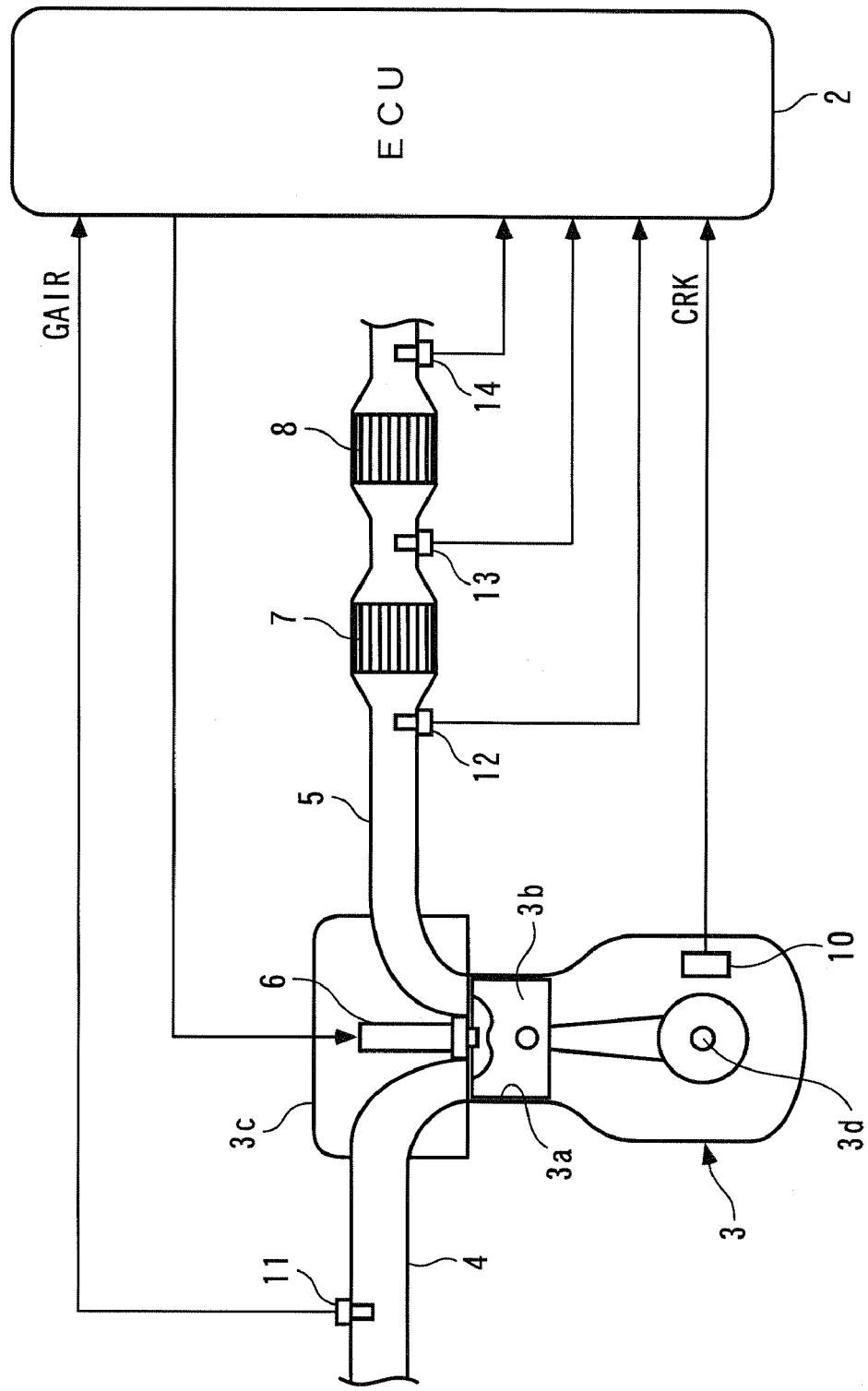
FIG. 10 is a schematic diagram of a catalyst deterioration-determining device according to a second embodiment of the present invention, and an internal combustion engine to which the catalyst deterioration-determining device is applied.

Referring to FIG. 10, similarly to the first embodiment, the catalyst 7 implemented by a three-way catalyst is disposed in the exhaust pipe 5 of the engine 3, as an upstream catalyst, and a downstream catalyst 8 is disposed downstream of the catalyst 7. The downstream catalyst 8 is implemented by a NOx catalyst, and has a capability of trapping, when exhaust gases forming an oxidation atmosphere flow therein, NOx in the exhaust gases, and an oxygen storage capability of storing oxygen in the exhaust gases.

Further, similarly to the first embodiment, the first LAF sensor 12 is disposed upstream of the catalyst 7 of the exhaust pipe 5, and the second LAF sensor 13 is disposed downstream of the catalyst 7, i.e. between the catalyst 7 and the downstream catalyst 8. Further, a third LAF sensor 14 is disposed downstream of the downstream catalyst 8. This third LAF sensor 14 is also formed by zirconia, and linearly detects oxygen concentration in exhaust gases downstream of the downstream catalyst 8 to deliver a detection signal indicative of the sensed oxygen concentration to the ECU 2. The ECU 2 calculates a third equivalent ratio KACT3 obtained by conversion of a mass ratio (fuel-air ratio) between an amount of reducing agents and an amount of oxygen in the exhaust gases downstream of the downstream catalyst 8.

Figure 11:
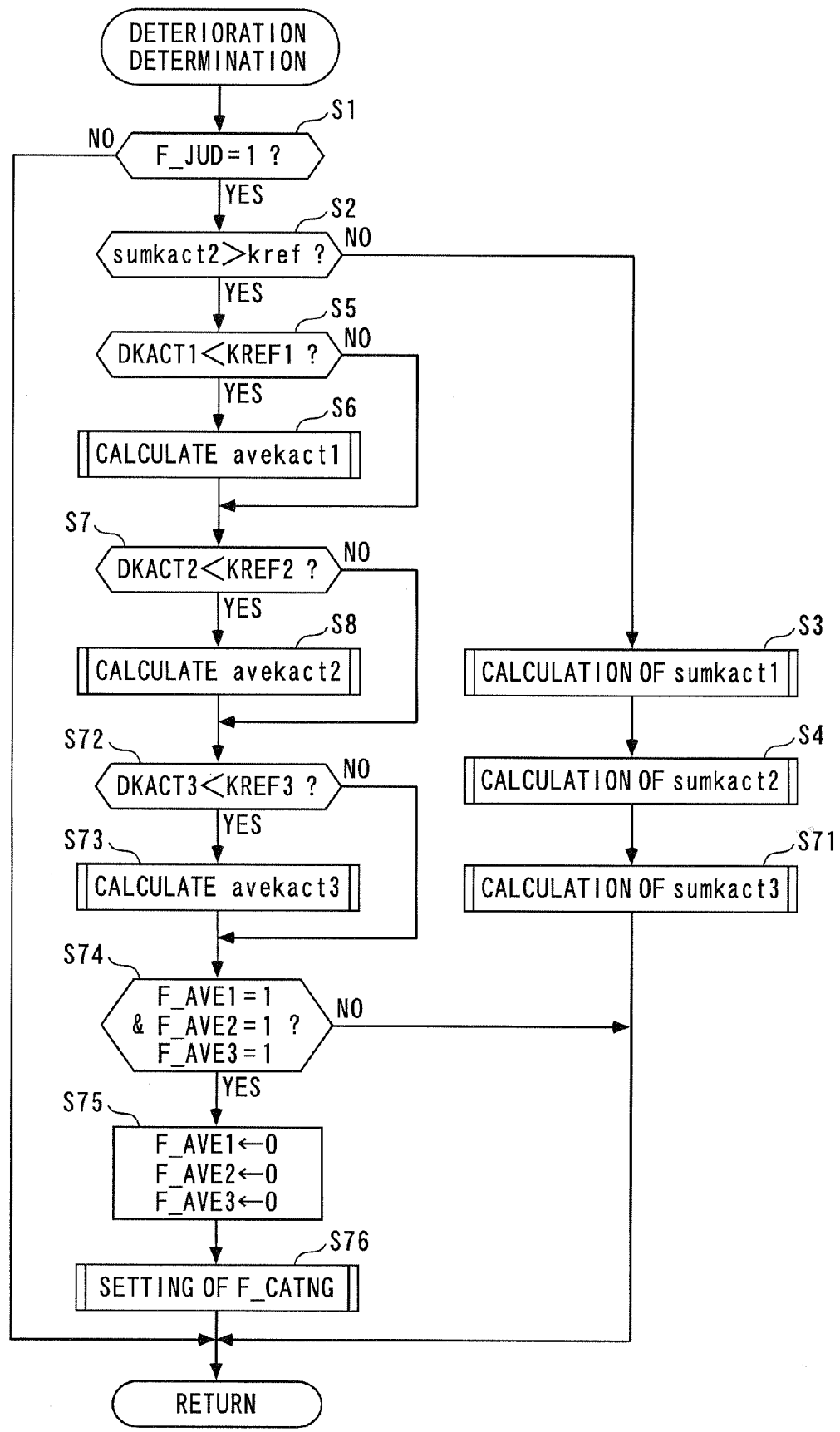
FIG. 11 is a flowchart of a deterioration determination process executed by the catalyst deterioration-determining device according to the second embodiment.
Figure 12:
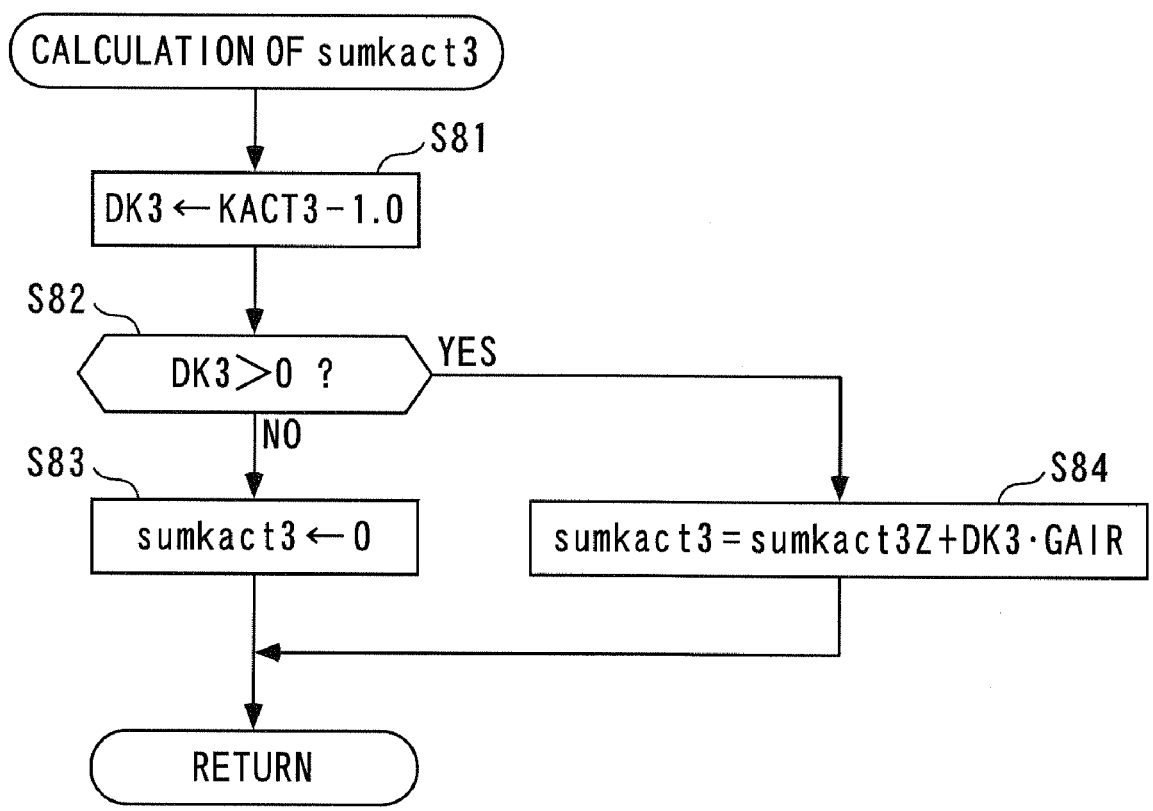
FIG. 12 is a subroutine showing a process for calculating a third reducing agent amount integrated value.

In the present embodiment, the deterioration determination is performed on both of the catalyst 7 and the downstream catalyst 8. FIG. 11 is a flowchart showing a deterioration determination process. It should be noted that before executing the deterioration determination process, the exhaust gas reduction control in which the exhaust gases are caused to be in a state switched from the oxidation atmosphere to the reduction atmosphere is executed similarly to the first embodiment.

In the present process, first, similarly to the first embodiment, when the judgment condition satisfaction flag F_JUD is equal to 1 (YES to the step 1), and at the same time, the second reducing agent amount integrated value sumkact2≦the predetermined value kref holds (NO to the step 2), the first and second reducing agent amount integrated values sumkact1 and sumkact2 are calculated (steps 3 and 4). These values are calculated similarly to the first embodiment by the calculation processes shown in FIGS. 3 and 4.

Next, a third reducing agent amount integrated terminating the preseunt process. The third reducing agent amount integrated value sumkact3 represents a total amount of reducing agents flowing through the downstream catalyst 8 during the exhaust gas reduction control, and by a subroutine shown in FIG. 12, it is calculated in the same manner as the first reducing agent amount integrated value sumkact1 is calculated.

More specifically, the difference between the third equivalent ratio KACT3 and 1.0 (=KACT3−1.0) is calculated as a third difference DK3 (step 81), and it is determined whether or not the third difference DK3 is larger than 0 (step 82). If the answer to this question is negative (NO), the third reducing agent amount integrated value sumkact3 is reset to 0 (step 83), whereas if is affirmative (YES), using the third difference DK3 and the intake air amount GAIR, the third reducing agent amount integrated value sumkact3 is calculated by the following equation (9) (step 84):

$$sumkact3 = sumkact3Z + DK3 \cdot GAIR \quad (9)$$

In this equation, sumkact3Z represents the immediately preceding value of the third reducing agent amount integrated value sumkact3. Then, the present invention is terminated.

As described above, the third reducing agent integrated value sumkact3 is calculated by integrated the product of the third difference DK3 and the intake air amount GAIR when DK3>0 holds, i.e. KACT3>1.0 holds, and hence it corresponds to a total amount of reducing agents flowing through the downstream catalyst 8 during the exhaust gas reduction control.

Referring again to FIG. 11, if the second reducing agent amount integrated value sumkact2>the predetermined value kref holds (YES to the step 2), similarly to the first embodiment, the step 5 to 8 are executed, whereby based on the first equivalent ratio KACT1 after it reached the steady state, the first equivalent ratio average value avekact1 is calculated, and based on the second equivalent ratio KACT2 after it reaches the steady state, the second equivalent ratio average value avekact2 is calculated.

Next, it is determined whether or not a third equivalent ratio change amount DKREF3 is smaller than a predetermined value KREF3 (step 72). The third equivalent ratio change amount DKREF3 is calculated as the absolute value of the difference between the present value and the immediately preceding value of the third equivalent ratio (=|KACT3−KACT3Z|). If the answer to this question is affirmative (YES), it is judged that the third equivalent ratio KACT3 has reached a steady state, so that an average value avekact3 of the third equivalent ratio KACT3 (hereinafter referred to as "the third equivalent ratio average value") is calculated (step 73). The third equivalent ratio average value avekact3 is calculated by averaging n values of the third equivalent ration KACT3 obtained after satisfaction of DKACT3<KREF3 (calculating an arithmetic mean thereof).

Further, upon completion of the calculation, a third averaging computation completion flag F_AVE3 is set to 1.

In a step following the step 73, it is determined whether or not all of the first to third averaging computation completion flag F_AVE1 to F_AVE3 are equal to 1. If the answer to this question is negative, the present process is immediately terminated.

On the other hand, if the answer to the question of the step 74 is affirmative (YES), i.e. if all of the first to third averaging computation completion flags F_AVE1 to F_AVE3 are equal to 1, they are all rest to 0 (step 75), and then a process for setting the catalyst deterioration flag F_CATNG is executed (step 765), followed by terminating the present process.

Figure 13:
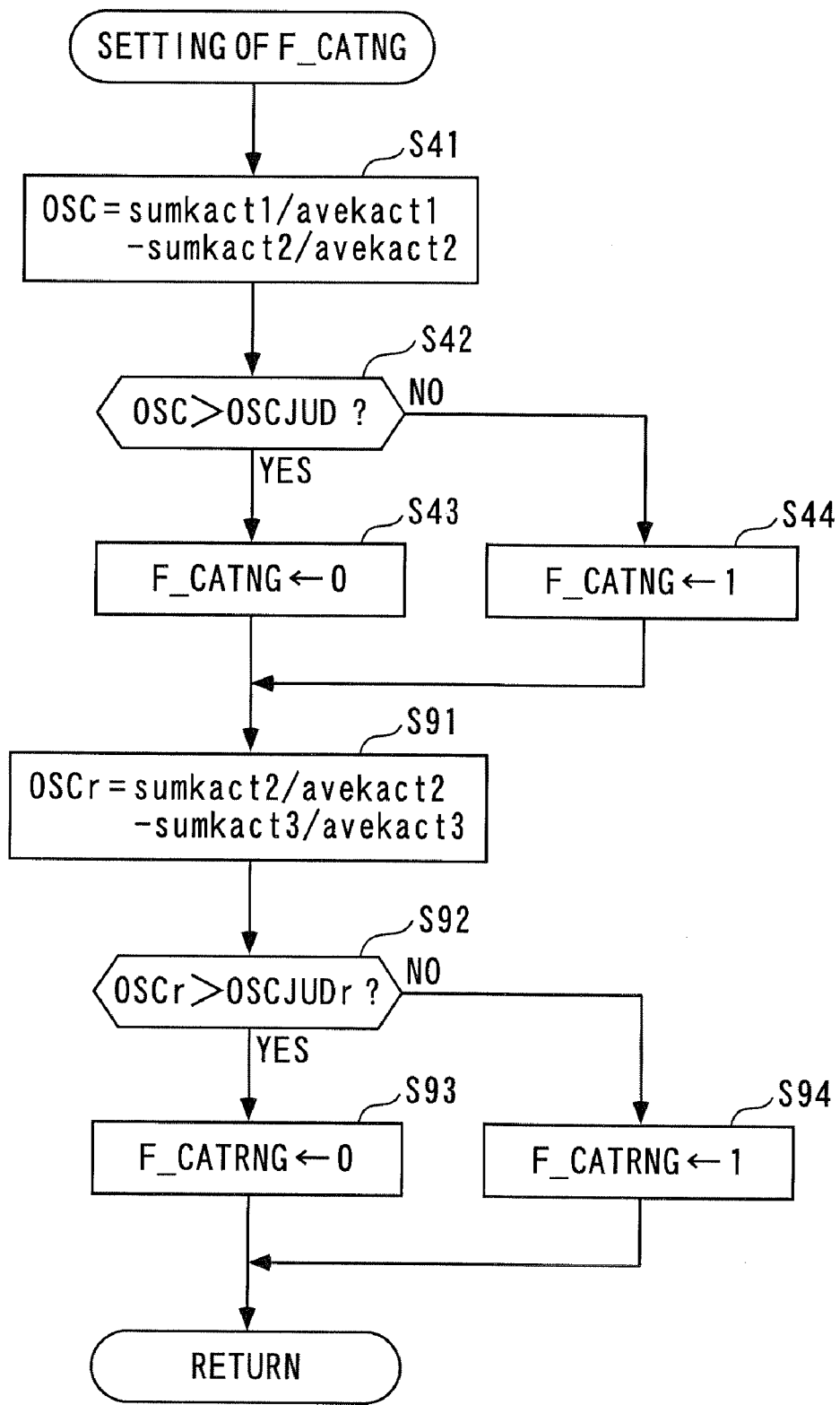
FIG. 13 is a subroutine showing a process for setting a catalyst deterioration flag.

FIG. 13 is a subroutine showing the process for setting the catalyst deterioration flag F_CATNG. In this process, first, quite in the same manner as in the FIG. 5 process of the first embodiment, in the steps 41 to 44, deterioration of the catalyst is determined based on the result of comparison between the oxygen storage capability OSC of the catalyst 7 calculated in the steps 41 to 44 and the reference value OSCJUD.

Next, an oxygen storage capability OSCr of the downstream catalyst 8 is calculated by the following equation (10) (step 91):

$$OSCr = \frac{sumkact2}{avekact2} - \frac{sumkact3}{avekact3} \qquad (10)$$

In this equation (10), for the same reason as described as to the equation (3), the oxygen storage capability OSCr of the downstream catalyst 8 is calculated as the difference between the ratio between the second reducing agent amount integrated value sumkact2 and the second equivalent ratio average value avekact2 and the ratio between the third reducing agent amount integrated value sumkact3 and the third equivalent ratio average value avekact3.

Next, it is determined whether or not the calculated oxygen storage capability OSCr is larger than a predetermined reference value OSCJUDr for the downstream catalyst (step 92). If the answer to this question is affirmative (YES), it is judged that the downstream catalyst 8 is not deteriorated, and to indicate this fact, a catalyst deterioration flag F_CATRNG for the downstream catalyst 8 is set to 0 (step 93), followed by terminating the present process.

On the other hand, if the answer to the question of the step 92 is negative (NO), it is judged that the downstream catalyst 8 is deteriorated, and to indicate this fact, the catalyst deterioration flag F_CATRNG is set to 1 (step 94), followed by terminating the present process.

As described above, according to the present embodiment, during the exhaust gas reduction control, based on the results of detection by the first and second LAF sensors 12 and 13 disposed upstream of the catalyst 7 and between the catalyst 7 and the downstream catalyst 8, respectively, similarly to the first embodiment, the oxygen storage capability OSC of the catalyst 7 is calculated, and the based on the results of detection by the second LAF sensors 13 and the third LAF sensor 14 disposed downstream of the downstream catalyst 8, similarly to the oxygen storage capability of the catalyst 7, the oxygen storage capability OSCr of the downstream catalyst 8 is calculated. Therefore, while compensating for the differences between the gains of the first to third LAF sensor 12 to 14, the oxygen storage capability OSC of the catalyst 7 and the oxygen storage capability OSCr of the downstream catalyst 8 can be properly calculated. As a result, without being adversely influenced by the differences in the gains of the first to third LAF sensors 12 to 14, based on the oxygen storage capabilities OSC and OSCr, it is possible to properly perform deterioration determination on the catalyst 7 and the downstream catalyst 8.

It should be noted that the present invention is by no means limited to the above-described embodiments, but it can be practiced in various forms. For example, although in the above-described embodiments, as the oxygen concentration parameters, the first to third equivalent ratios KACT1 to KACT 3 are used, this is not limitative, but any other desired parameters may be employed insofar as they are parameters indicative of oxygen concentration in exhaust gases. For example, since the concentration of reducing agents, such as HC and CO, in exhaust gases has a correlation with the concentration of oxygen, it may be employed as an oxygen concentration parameter.

Further, although in the above-described embodiments, the determination of the steady states of the first to third equivalent ratios KACT1 to KACT3 for determining whether or not the predetermined time period has elapsed after switching of the exhaust gases to the reduction atmosphere is carried out by comparing the equivalent ratio change amounts DKACT1 to DKACT3 with the predetermined values KREF1 to KREF3, respectively, this is not limitative, but any other suitable method may be employed. For example, a time period elapsed after the switching of exhaust gases to the reduction atmosphere or a time elapsed after the first to third equivalent ratios KACT1 to KACT3 exceed 1.0 may be measured using a timer, and when the measured time period reaches a predetermined time period, it may be judged that the first to third equivalent ratios KACT1 to KACT3 have reached the steady states.

Further, in the above-described embodiments, the exhaust gas reduction control in which the exhaust gases are caused to be in a state switched from the oxidation atmosphere to the reduction atmosphere is carried out by controlling the amount of fuel injected into the combustion chamber 3a, this is not limitative, but it may be carried out by directly supplying fuel or urea as a reducing agent to the upstream side of the upstream LAF sensor 12 in the exhaust pipe 5. Alternatively, the deterioration determination may be carried out by placing the exhaust gases in a state switched from the reduction atmosphere to the oxidation atmosphere, instead of by executing the exhaust gas reduction control.

Further, the first embodiment is an example in which the catalyst 7 is a three-way catalyst, while the second embodiment is an example in which the catalyst 7 disposed upstream is a three-way catalyst, and the downstream catalyst 8 is a NOx catalyst, this is not limitative, but the types, arrangement, and number of catalysts may be changed as desired, insofar as the catalysts have an oxygen storage capability.

Further, although in the second embodiment, the calculation of the oxygen storage capability OSCr of the downstream catalyst 8 is carried out using the equation (10) corresponding to the equation (3), this is not limitative, but in place of the equation (10), an equation corresponding to the equation (5) or (7) each used in a variation of the first embodiment may be used.

Furthermore, although in the above-described embodiment, the engine 3 as the internal combustion engine in the present invention is the diesel engine installed on a vehicle, this is not limitative, but the present invention may be applied to various engines other than the diesel engine, such as a gasoline engine, and further, to engines other than those for vehicles, including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A catalyst deterioration-determining device that determines deterioration of a catalyst disposed in an exhaust passage of an internal combustion engine, for purifying exhaust gases, the catalyst having an oxygen storage capability for storing oxygen, comprising:
    a first oxygen concentration parameter sensor that detects an upstream oxygen concentration parameter indicative of an oxygen concentration in exhaust gases on an upstream side of the catalyst;
    a second oxygen concentration parameter sensor that detects a downstream oxygen concentration parameter indicative of an oxygen concentration in exhaust gases on a downstream side of the catalyst;
    control means for controlling exhaust gases flowing into the catalyst by switching the exhaust gases between an oxidation atmosphere and a reduction atmosphere;
    correction means for correcting the upstream oxygen concentration parameter and the downstream oxygen concentration parameter which are detected after the exhaust gases are switched by said control means, such that the upstream oxygen concentration parameter and the downstream oxygen concentration parameter which are detected after lapse of a predetermined time period coincide with each other; and
    deterioration determination means for determining deterioration of the catalyst based on results of comparison between the upstream oxygen concentration parameter and the downstream oxygen concentration parameter which are corrected.

2. A catalyst deterioration-determining device as claimed in claim 1, further comprising integrated value-calculating means for calculating an integrated value of the upstream oxygen concentration parameter and an integrated value of the downstream oxygen concentration parameter, and
    wherein said correction means corrects the integrated value of the upstream oxygen concentration parameter and the integrated value of the downstream oxygen concentration parameter, by calculating a ratio between the calculated integrated value of the upstream oxygen concentration parameter and the upstream oxygen concentration parameter detected after the lapse of the predetermined time period, and a ratio between the calculated integrated value of the downstream oxygen concentration parameter and the downstream oxygen concentration parameter detected after the lapse of the predetermined time period, and
    wherein said deterioration determining means determines the deterioration of the catalyst based on results of comparison between the corrected integrated value of the upstream oxygen concentration parameter and the corrected integrated value of the downstream oxygen concentration parameter.

3. A catalyst deterioration-determining device as claimed in claim 2, wherein said correction means multiplies the corrected integrated values of the upstream oxygen concentration parameter and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameter.

4. A catalyst deterioration-determining device as claimed in claim 1, further comprising steady state-determining means for determining whether or not the upstream oxygen concentration parameter and the downstream oxygen concentration parameter reach a steady state, and
    wherein the predetermined period is a time period to elapse after switching of the exhaust gases before it is determined that both of the upstream oxygen concentration parameter and the downstream oxygen concentration parameter reach the steady state.

5. A catalyst deterioration-determining method for determining deterioration of a catalyst disposed in an exhaust passage of an internal combustion engine, for purifying exhaust gases, the catalyst having an oxygen storage capability for storing oxygen, comprising:
    detecting an upstream oxygen concentration parameter indicative of an oxygen concentration in exhaust gases on an upstream side of the catalyst;
    detecting a downstream oxygen concentration parameter indicative of an oxygen concentration in exhaust gases on a downstream side of the catalyst;
    controlling exhaust gases flowing into the catalyst by switching the exhaust gases between an oxidation atmosphere and a reduction atmosphere;
    correcting the upstream oxygen concentration parameter and the downstream oxygen concentration parameter which are detected after the exhaust gases are switched by said controlling, such that the upstream oxygen concentration parameter and the downstream oxygen concentration parameter which are detected after lapse of a predetermined time period coincide with each other; and
    determining deterioration of the catalyst based on results of comparison between the upstream oxygen concentration parameter and the downstream oxygen concentration parameter which are corrected.

6. A catalyst deterioration-determining method as claimed in claim 5, further comprising calculating an integrated value of the upstream oxygen concentration parameter and an integrated value of the downstream oxygen concentration parameter, and
    wherein said correcting includes correcting the integrated value of the upstream oxygen concentration parameter and the integrated value of the downstream oxygen concentration parameter, by calculating a ratio between the calculated integrated value of the upstream oxygen concentration parameter and the upstream oxygen concentration parameter detected after the lapse of the predetermined time period, and a ratio between the calculated integrated value of the downstream oxygen concentration parameter and the downstream oxygen concentration parameter detected after the lapse of the predetermined time period, and
    wherein said determining includes determining the deterioration of the catalyst based on results of comparison between the corrected integrated value of the upstream oxygen concentration parameter and the corrected integrated value of the downstream oxygen concentration parameter.

7. A catalyst deterioration-determining method as claimed in claim 6, wherein said correcting includes multiplying the corrected integrated values of the upstream oxygen concentration parameter and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameter.

8. A catalyst deterioration-determining method as claimed in claim 5, further comprising determining whether or not the upstream oxygen concentration parameter and the downstream oxygen concentration parameter reach a steady state, and wherein the predetermined period is a time period to elapse after switching of the exhaust gases before it is determined that both of the upstream oxygen concentration parameter and the downstream oxygen concentration parameter reach the steady state.

9. An engine control unit including a control program for causing a computer to execute a catalyst deterioration-determining method for determining deterioration of a catalyst disposed in an exhaust passage of an internal combustion engine, for purifying exhaust gases, the catalyst having an oxygen storage capability for storing oxygen, wherein the catalyst deterioration-determining method comprises:

detecting an upstream oxygen concentration parameter indicative of an oxygen concentration in exhaust gases on an upstream side of the catalyst;

detecting a downstream oxygen concentration parameter indicative of an oxygen concentration in exhaust gases on a downstream side of the catalyst;

controlling exhaust gases flowing into the catalyst by switching the exhaust gases between an oxidation atmosphere and a reduction atmosphere;

correcting the upstream oxygen concentration parameter and the downstream oxygen concentration parameter which are detected after the exhaust gases are switched by said controlling, such that the upstream oxygen concentration parameter and the downstream oxygen concentration parameter which are detected after lapse of a predetermined time period coincide with each other; and determining deterioration of the catalyst based on results of comparison between the upstream oxygen concentration parameter and the downstream oxygen concentration parameter which are corrected.

10. An engine control unit including a control program as claimed in claim 9, wherein the catalyst deterioration-determining method further comprises calculating an integrated value of the upstream oxygen concentration parameter and an integrated value of the downstream oxygen concentration parameter, and wherein said correcting includes correcting the integrated value of the upstream oxygen concentration parameter and the integrated value of the downstream oxygen concentration parameter, by calculating a ratio between the calculated integrated value of the upstream oxygen concentration parameter and the upstream oxygen concentration parameter detected after the lapse of the predetermined time period, and a ratio between the calculated integrated value of the downstream oxygen concentration parameter and the downstream oxygen concentration parameter detected after the lapse of the predetermined time period, and wherein said determining includes determining the deterioration of the catalyst based on results of comparison between the corrected integrated value of the upstream oxygen concentration parameter and the corrected integrated value of the downstream oxygen concentration parameter.

11. An engine control unit including a control program as claimed in claim 10, wherein said correcting includes multiplying the corrected integrated values of the upstream oxygen concentration parameter and the downstream oxygen concentration parameter, by one oxygen concentration parameter out of the upstream and downstream oxygen concentration parameters detected after the lapse of the predetermined time period, thereby further correcting the integrated value of the upstream oxygen concentration parameter and the integrated value of the downstream oxygen concentration parameter, with reference to the one oxygen concentration parameter.

12. An engine control unit including a control program as claimed in claim 9, wherein the catalyst deterioration-determining method further comprises determining whether or not the upstream oxygen concentration parameter and the downstream oxygen concentration parameter reach a steady state, and wherein the predetermined period is a time period to elapse after switching of the exhaust gases before it is determined that both of the upstream oxygen concentration parameter and the downstream oxygen concentration parameter reach the steady state.

* * * * *